US012799722B2

(12) United States Patent
Tseng

(10) Patent No.: US 12,799,722 B2
(45) Date of Patent: Nov. 17, 2026

(54) ATMOSPHERIC WATER GENERATION SYSTEM

(71) Applicants: Kingtronics Smart Industrial Interconnection Networking (Fujian) Co., Ltd., Xiamen (CN); Kingtronics Smart Industrial (Xiamen) Co., Ltd., Xiamen (CN)

(72) Inventor: Chee Henry Tseng, Xiamen (CN)

(73) Assignee: Kingtronics Smart Industrial Interconnection Networking (Fujian) Co., Ltd., Xiamen (CN)

( * ) Notice: Subject to any disclaimer, the term of this patent is extended or adjusted under 35 U.S.C. 154(b) by 354 days.

(21) Appl. No.: 18/602,057

(22) Filed: Mar. 12, 2024

(65) Prior Publication Data

US 2025/0179777 A1 Jun. 5, 2025

(30) Foreign Application Priority Data

Dec. 5, 2023 (CN) ........................ 202311662015.X
Dec. 28, 2023 (CN) ........................ 202311843938.5

(51) Int. Cl.
*E03B 3/28* (2006.01)
*B01D 53/26* (2006.01)
(Continued)

(52) U.S. Cl.
CPC .............. *E03B 3/28* (2013.01); *B01D 53/265* (2013.01); *C02F 9/00* (2013.01); *B01D 2257/80* (2013.01); *B01D 2258/06* (2013.01); *C02F 1/001* (2013.01); *C02F 1/32* (2013.01); *C02F 1/50* (2013.01); *C02F 2201/782* (2013.01); *C02F 2303/04* (2013.01)

(58) Field of Classification Search
CPC ........................................................ E03B 3/28
See application file for complete search history.

(56) References Cited

U.S. PATENT DOCUMENTS

2008/0022694 A1* 1/2008 Anderson .............. B01D 5/009 62/3.4

FOREIGN PATENT DOCUMENTS

CN 210887419 U 6/2020
CN 113719907 A * 11/2021 .............. F24F 11/89
(Continued)

*Primary Examiner* — Eric S Ruppert

(74) *Attorney, Agent, or Firm* — Ming Jiang; OPENPTO US LLC

(57) ABSTRACT

The disclosure provides an atmospheric water generation system, comprising an atmospheric water generation device and a control device for controlling operation of the atmospheric water generation system. The atmospheric water generation device comprises a water evaporator, a condenser connected with the water evaporator, a compressor connected with the water evaporator and the condenser so as to cyclically cooled down and supply the refrigerant, a fan device disposed between the condenser and the compressor, and a noise reduction device disposed between the fan device and the compressor. In such a case, outside air can pass through the water evaporator to produce water and cool air, the cool air can cool down the condenser, then flow to the noise reduction device to reduce noise, and then residual cool air can flow to the compressor and heating components of the control device, for cooling and heat dissipation.

11 Claims, 21 Drawing Sheets

(51) Int. Cl.

| | |
|---|---|
| ***C02F 9/00*** | (2023.01) |
| *C02F 1/00* | (2023.01) |
| *C02F 1/32* | (2023.01) |
| *C02F 1/50* | (2023.01) |

(56) References Cited

FOREIGN PATENT DOCUMENTS

CN 114550679 A * 5/2022 ............. G10K 11/16
CN 115492194 A * 12/2022 ............... A61L 2/20

* cited by examiner

ATMOSPHERIC WATER GENERATION SYSTEM

CROSS-REFERENCE TO PRIOR APPLICATION

This application claims the benefit of the priorities of Chinese Patent Application No. 202311662015.X filed on Dec. 5, 2023 and Chinese Patent Application No. 202311843938.5 filed on Dec. 28, 2023, the contents of which are incorporated herein by reference.

TECHNICAL FIELD

The disclosure relates to the technical field of atmospheric water generation, more particularly to an atmospheric water generation system.

BACKGROUND

The atmospheric water generator is designed based on the principle that the refrigerant from the compressor can be compressed, condensed, and vaporized for cooling. In the evaporator pipe, the liquid refrigerant changes phase and vaporizes to absorb heat energy. Consequently, the vapor in the air can be condensed into water, which can be collected as a water source for the atmospheric water generator.

As the atmospheric water generator is internally arranged with devices such as a fan device and a condenser, it usually makes a loud noise during operation. Chinese utility model CN210887419U in relevant technology discloses an atmospheric water generator with low work noise. By means of acoustic panels provided on both top and bottom portions of the body of the water generator, it absorbs noise produced during operation of the body of the water generator. However, such solution for noise reduction fails to efficiently utilize internal energy and has high consumption. It is desired to improve its practicability.

SUMMARY

The disclosure aims to solve at least one of the above problems to some extent. To this end, one of the goals of the disclosure is to provide an atmospheric water generation system having low noise and utilizing energy efficiently with low consumption and improved practicability.

In order to achieve the above goal, the disclosure provides an atmospheric water generation system, comprising an atmospheric water generation device and a control device;

Herein, the control device is configured to control the operation of the atmospheric water generation system;

Herein, the atmospheric water generation device comprises a water evaporator, a condenser, a compressor, a fan device, and a noise reduction device, wherein the condenser is connected with the water evaporator, and the compressor is connected with the water evaporator and the condenser, so as to cyclically cool down and supply a refrigerant, the noise reduction device is disposed between the fan device and the compressor, and the fan device is disposed between the condenser and the compressor, such that outside air can pass through the water evaporator to produce water and cool air, the cool air can cool down the condenser and then flow to the noise reduction device to reduce noise, and then residual cool air can flow to the compressor and a heating component of the control device, for cooling and heat dissipation.

In the atmospheric water generation system according to the embodiment of the disclosure, outside air flows to the water evaporator under the action of the fan device, such that both water and cool air can be produced. The cool air can cool down the condenser, then can be treated by means of the noise reduction device for noise reduction. Then, residual cool air can flow to the compressor and heating components (for example the heat sink of the control plate) of the control device, for cooling. In this way, by using the noise reduction device to reduce noise produced in the atmospheric water generation system, and utilizing cool air to cool down the heating parts such as the condenser, the compressor, and the heat sink in the atmospheric water generation system, the system can reduce noise and meanwhile utilize residual cool air for cooling, thereby raising energy efficiency and improving practical performance of water generation.

Furthermore, the atmospheric water generation system according to the embodiment of the disclosure may be further arranged as follows.

Optionally, the noise reduction device may be disposed at an air outlet of the fan device; and the noise reduction device may be provided with a plurality of pieces of sound absorbing cotton which are arranged to have a three-dimensional network structure, and the three-dimensional network structure may be provided with at least one air passage extending through a top portion and a bottom portion of the three-dimensional network structure. Thus, as the noise reduction device is made of sound absorbing material designed in such a manner of at least one air passage allowing for air circulation, it achieves optimized noise reduction effect without affecting the air flow. Furthermore, several circumferentially-spaced guiding channels may be provided on the inner sidewall of each of the air passages. With such arrangement, the noise reduction device would not impede the transfer of the residual cool air, and optimized noise reduction effect can be achieved without affecting the air flow.

Optionally, a water collection device may be further provided, which may comprise a water collecting tray, a water filter, and a water tank;

The water tank may be a rectangular cuboid. The water tank water outlet may be higher than a bottom surface of the water tank by a few centimeters, such that a few centimeters of water may be retained at the bottom of the water tank, to get water deposits.

The water tank may be provided with a water filter which is convenient to remove;

The water collecting tray may be disposed between the water evaporator and the water tank, to collect water produced by the water evaporator. The water collecting tray may have a funnel shape and may be provided at the bottom with a water collecting tray water outlet, to allow the water to flow from through water collecting tray water outlet to the water filter, and flow back to the water tank after filtration;

The water filter may be disposed between the water collecting tray and the water tank, for filtration of collected water, and the water filter may be a structure allowing for quick replacement, to achieve quick replacement.

Optionally, the system may further comprise a water cooling device, which is provided with a storage tank, a cold water pump, a straight cooling tube, a cold water circulating valve, and a cold water output valve;

The straight cooling tube may utilize a structure of tubular shape with multi-segment, comprising an inner tube (i.e., a cold evaporation tube) and an outer tube (i.e., a water container), to realize quick cooling function of water.

The straight cooling tube may be disposed between the storage tank output valve and the cold water pump, the cold water output valve, and the cold water circulating valve. In order to reduce consumption, the straight cooling tube works when cold water output is needed. Under the action of the cold water pump, the water of the storage tank flows to the straight cooling tube through the storage tank output valve, and then the straight cooling tube may quickly cool the water to a desired temperature (for example, 3-4° C.)

Under the action of the cold water pump, a circulation of cold water can be achieved by means of the cold water pump, the straight cooling tube, and the cold water circulating valve. During the standby state or when cold water output is not needed, the straight cooling tube may intermittently work, to ensure that the water in the straight cooling tube can be kept at a temperature of 3-4° C., thereby reducing consumption.

The inner tube of the straight cooling tube may be in communication with the condenser and the compressor, such that the straight cooling tube and the water evaporator can share one set of compressor and condenser. The two expansion valves (i.e., the water-producing expansion valve and the instant cold expansion valve) are respectively connected with the straight cooling tube and the water evaporator; Depending on water-producing and cooling requirements, water-producing expansion valve and the instant cold expansion valve can be automatically adjusted under the control of the control device, thereby achieving condensation for producing water and cooling function by cold water, and reducing the number of parts of the whole atmospheric water generation system. Consequently, the whole system with components in cooperation has compact structure with greatly reduced volume, reduced cost and consumption, and improved practicability.

In addition, the storage tank may be withdrawably arranged in the accommodation cavity of the atmospheric water generation system. The water inlet and the water outlet of the storage tank may be provided with a first quick plug connector to facilitate removal for cleaning and quick mounting of storage tank.

Optionally, the system may further comprise a water heating device, which is provided with a hot water input valve, a hot water tank, a hot water pump, a direct heater for quick heating of water, a flowmeter, a hot water output valve, and a hot water circulating valve.

Hot water is produced as follows. The water may flow through the hot water input valve to enter the hot water tank. By external cyclically heating, the water of the hot water tank may be kept at a certain temperature (for example: 70° C.-80° C.). When a user needs hot water, the hot water can flow through the hot water pump and then can be heated by means of the direct heater, such that the water can be further heated to a desired temperature (for example, 95-100° C.) and then controlled by means of the hot water output valve to output.

Hot water is circulated as follows. During the standby state or when hot water output is not needed, the hot water may flow through the direct heater, the hot water circulating valve, and then flows back to the hot water tank, thereby achieving hot water flow circulation. In such a case, the direct heater may intermittently work, to allow the water of the hot water tank to be kept at a temperature (for example, 70° C.-80° C.) which is relatively not that high, thereby reducing consumption and meanwhile achieving sterilization function.

Optionally, the system may further comprise a water purification device, which is provided a combination filter and a sterilizer, wherein the combination filter may be disposed in a water path communicating the water tank and the storage tank, and in a water path communicating the storage tank and the straight cooling tube, so as to perform water filtration; and the sterilizer may be disposed in a water path communicating the storage tank and the straight cooling tube, so as to accomplish water disinfection and sterilization.

The combination filter may be provided with a filter housing, and a plurality of various types of filter elements may be disposed in the filter housing, the filter housing may be withdrawably disposed in the accommodation cavity of the atmospheric water generation system, and a water inlet and a water outlet of the filter elements may be provided with a second quick plug connector. With such arrangement, it is convenient to maintain, and replace the filter, so as to ensure good water quality.

The sterilizer may be an externally arranged ultraviolet and ozone disinfection device. It may comprise an UV lamp which can be conveniently replaced. It may be outward inclined, such that during replacement of the UV lamp, the UV lamp can be conveniently replaced due to the outward inclined sterilizer.

The sterilizer may be further provided with an ozone inlet. The ozone disinfection can be accomplished by using an ozone pump for feeding the ozone generated by the ozone generator into the sterilizer, whereby the ozone fully dissolved in the flowing water can accomplish disinfection and sterilization.

The water of the storage tank can flow to the sterilizer so as to externally cyclically achieve ultraviolet and ozone disinfection, that is, ultraviolet germicidal irradiation and ozone disinfection for the flowing water, by controlling water flow circulation.

Optionally, the system may further comprise a cleaning device, which is provided with an external rinsing pail, a circulating pump, a drain valve, and a water pump.

The water tanks can be cleaned in a process as follows. Firstly, the drain valve can be opened. Under the action of the water pump, the water in the water tank (the storage tank or the hot water tank) can be pumped into the external rinsing pail. Under the action of the circulating pump, the rinsing water in the external rinsing pail can be fed into the water tank. In this way, the water tank can be cleaned cyclically. During cleaning, the external rinsing pail may get a rinsing water change.

Optionally, the system may further comprise a rack which defines the accommodation cavity of the atmospheric water generation system, wherein the accommodation cavity may comprise a first cavity, a second cavity, and a third cavity, wherein the water evaporator, the condenser, and the fan device of the atmospheric water generation device, and the water heating device may be disposed in the first cavity, the compressor of the atmospheric water generation device, the noise reduction device, and the control plate of the control device may be disposed in the second cavity, and the water collection device, the water cooling device, and the water purification device may be disposed in the third cavity. in this way, the whole atmospheric water generation system has a compact structure.

In the following description, further aspects and advantages of the invention will be partially illustrated and become apparent from the following description or from implementation of the invention.

Figure 1:
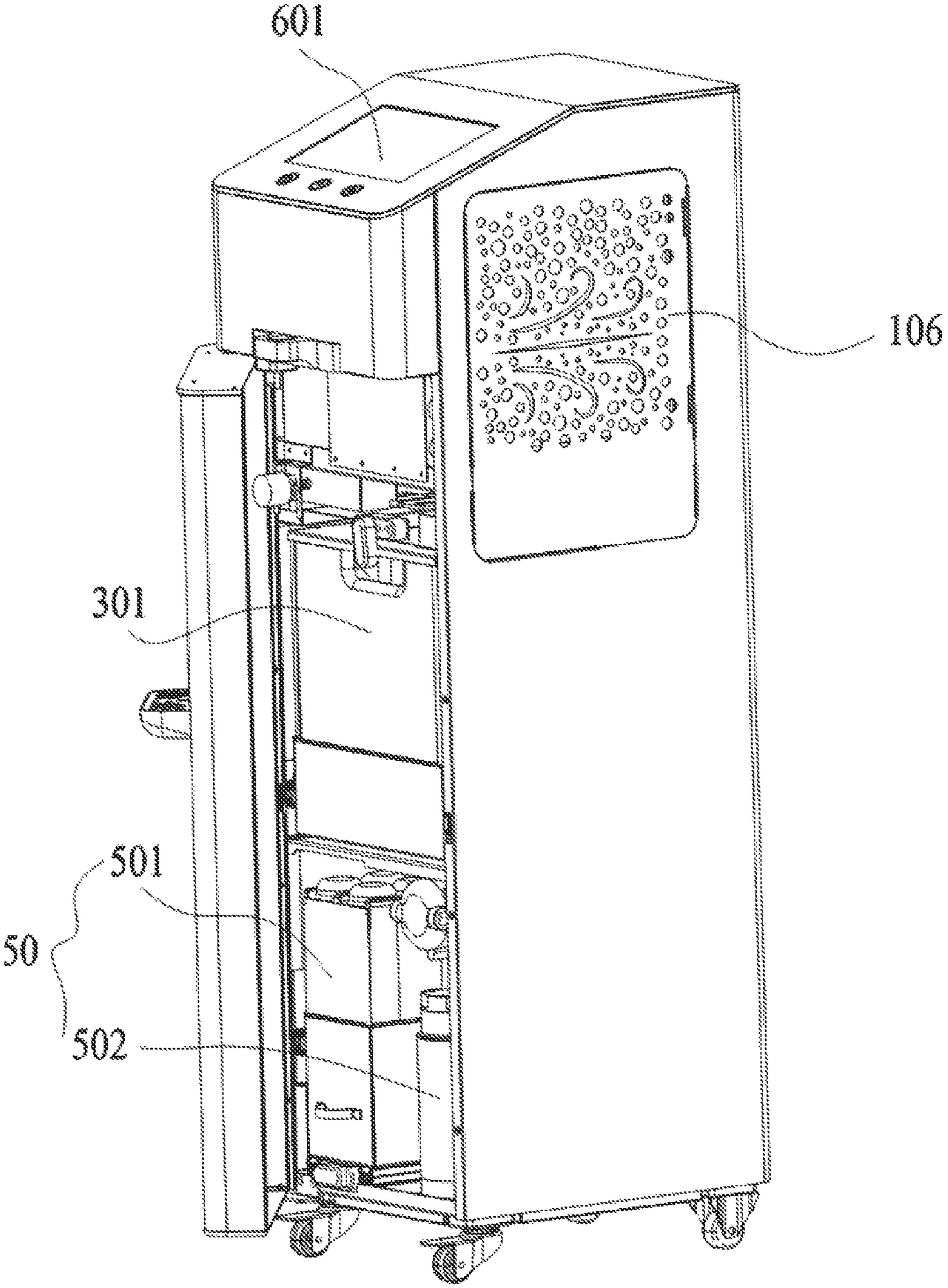
FIG. 1 is a schematic view illustrating an atmospheric water generation system according to an embodiment of the disclosure.
Figure 2:
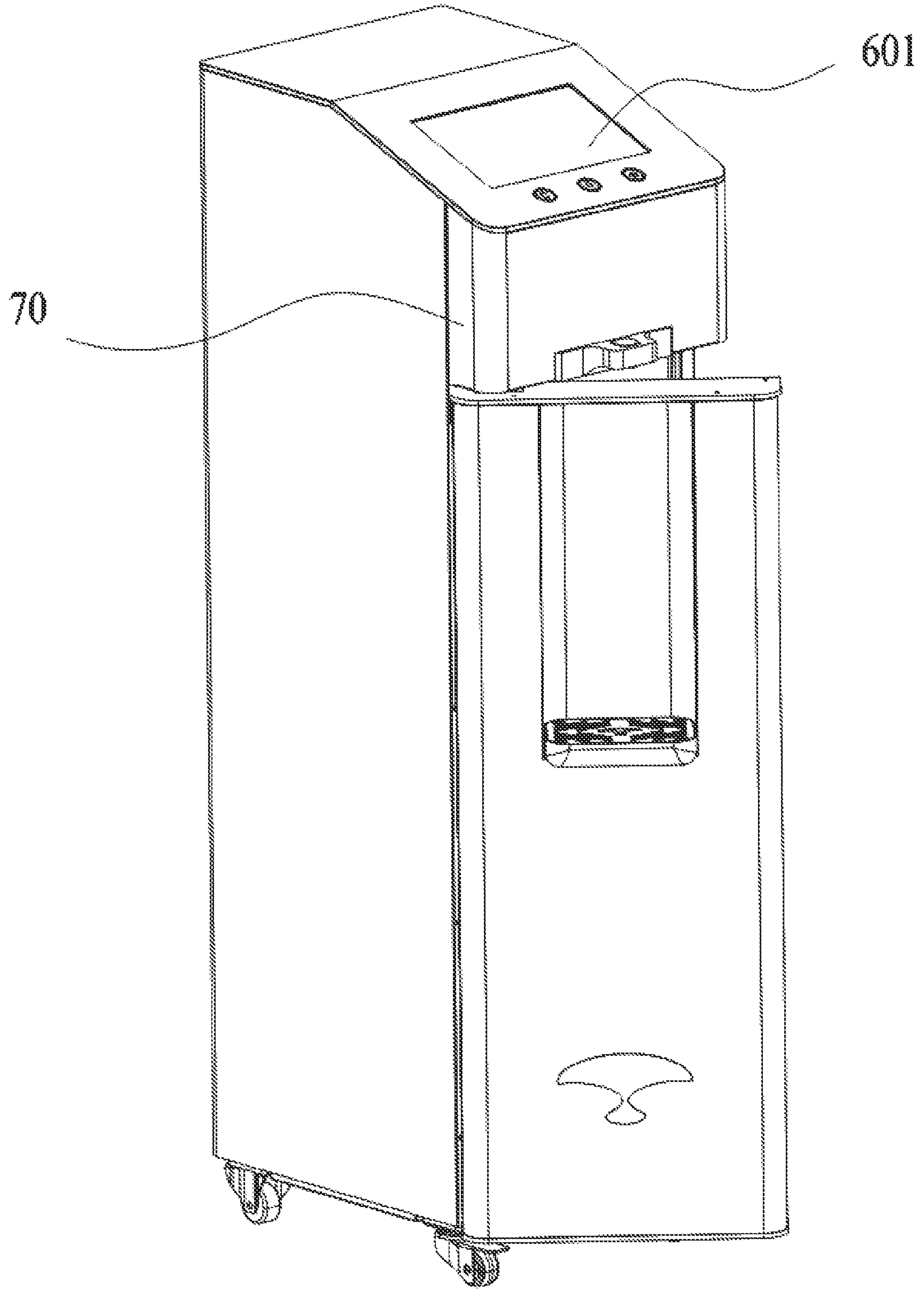
FIG. 2 is a schematic view illustrating an atmospheric water generation system according to an embodiment of the disclosure from another viewing angle.
Figure 3:
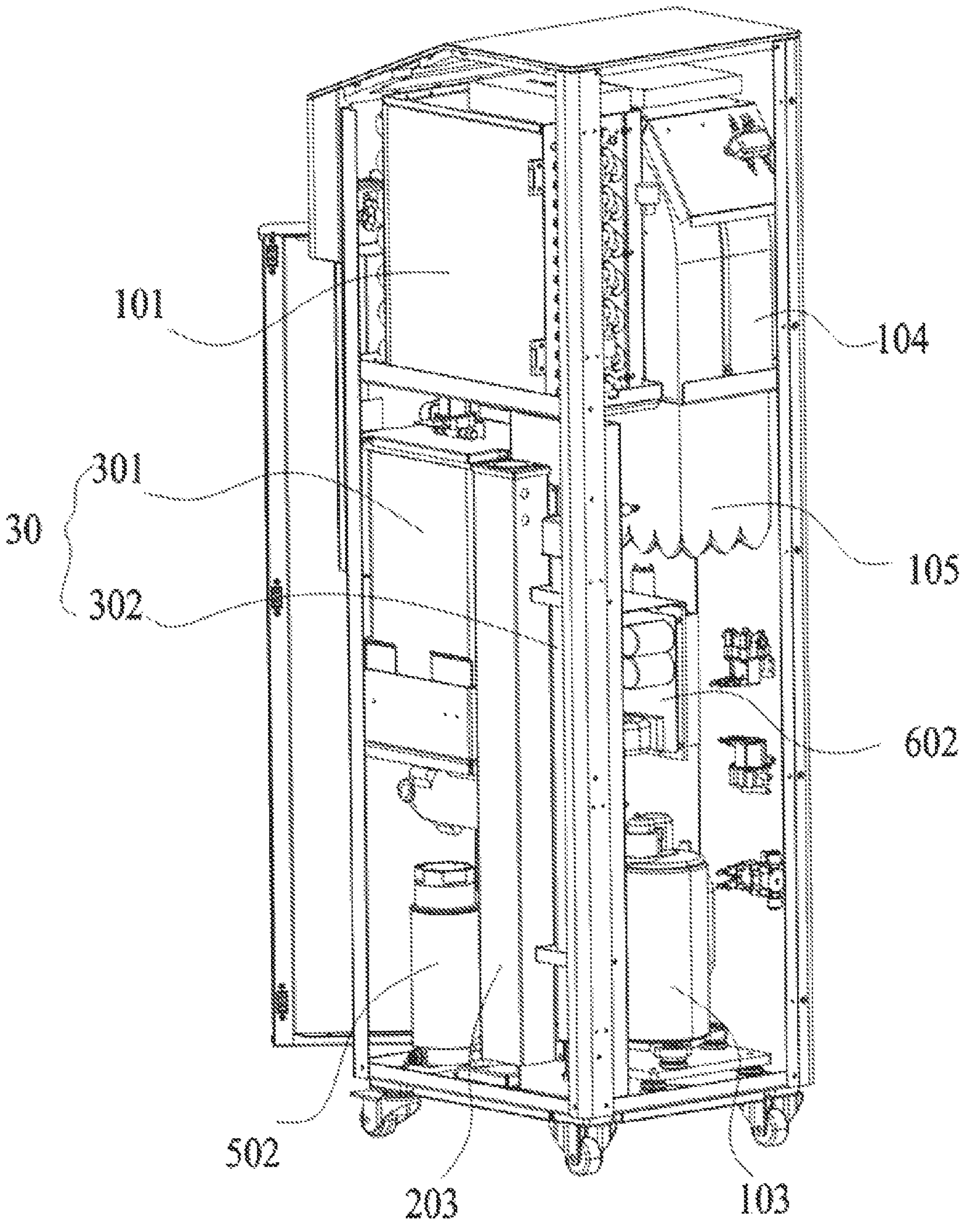
FIG. 3 is a schematic internal structure view illustrating an atmospheric water generation system according to an embodiment of the disclosure from a first viewing angle.
Figure 4:
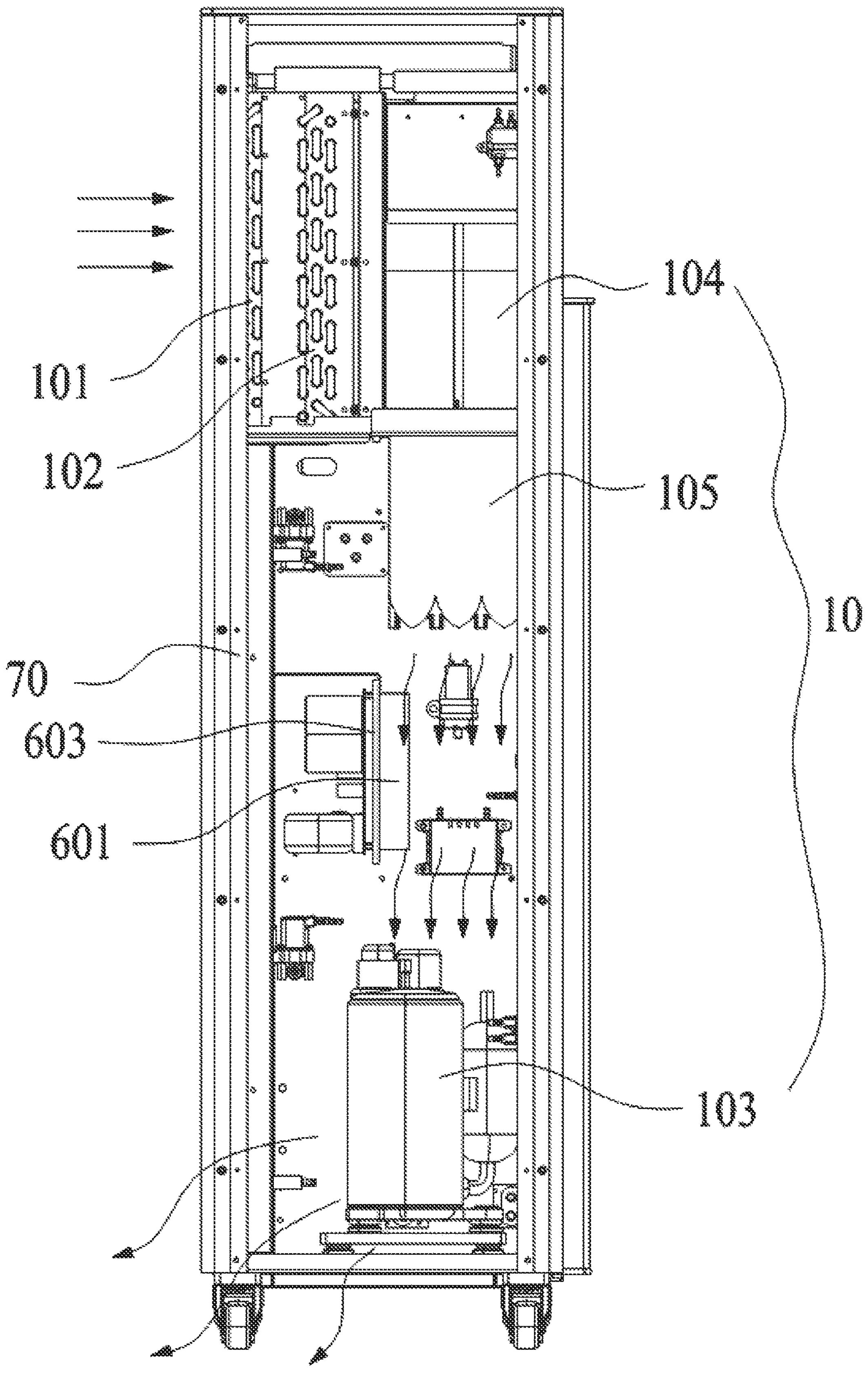
FIG. 4 is a schematic internal structure view illustrating an atmospheric water generation system according to an embodiment of the disclosure from a second viewing angle.
Figure 5:
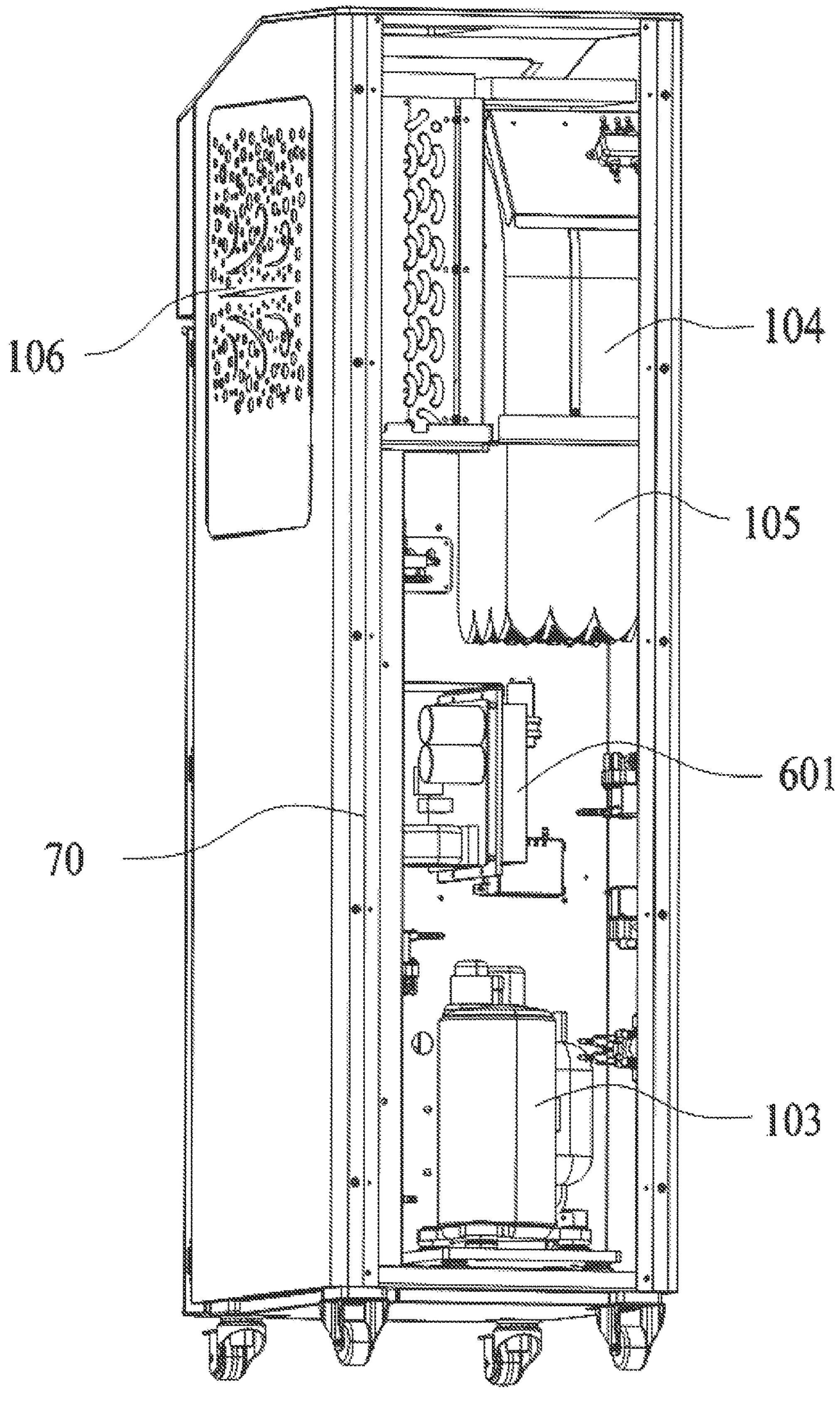
FIG. 5 is a schematic internal structure view illustrating an atmospheric water generation system according to an embodiment of the disclosure from a third viewing angle.
Figure 6:
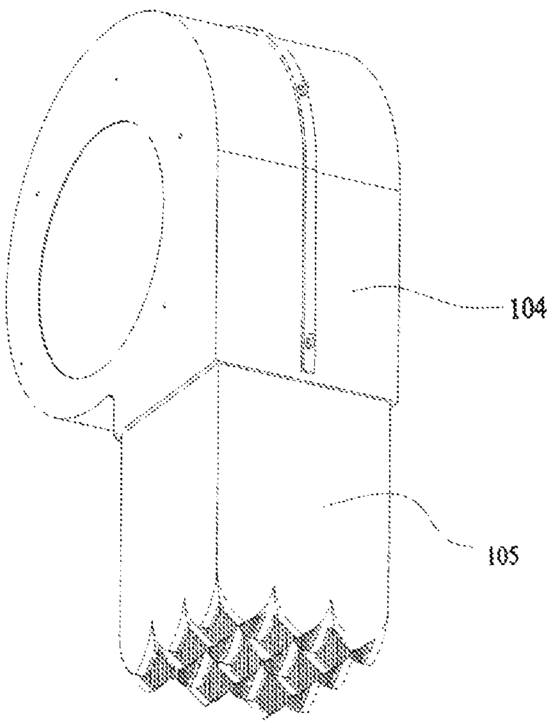
FIG. 6 is a schematic view illustrating a fan device and a noise reduction device according to an embodiment of the disclosure.
Figure 7:
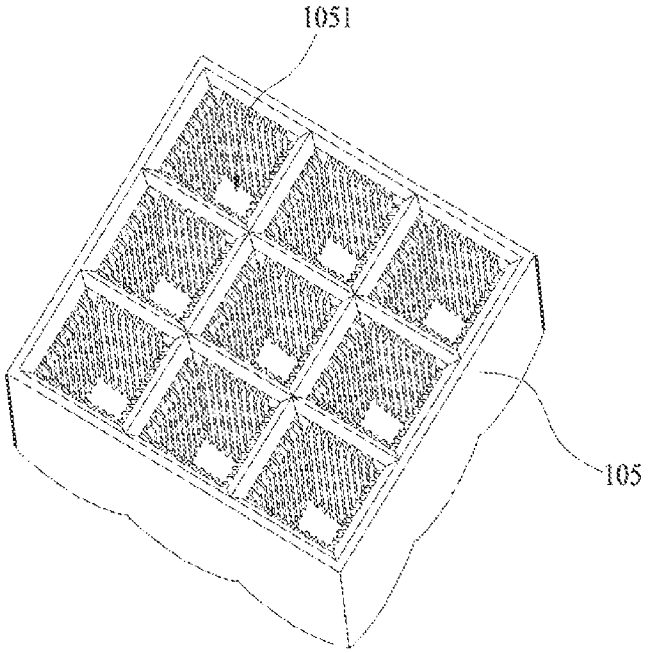
FIG. 7 is a schematic view illustrating a noise reduction device according to an embodiment of the disclosure.

Reference signs are listed below.

- atmospheric water generation device 10, water evaporator 101, condenser 102, compressor 103, fan device 104, noise reduction device 105, air passages 1051, air filter 106;
- water collection device 20, water collecting tray 201, water collecting tray water outlet 2011, division plate 2012, first tray portion 2013, second tray portion 2014, water filter 202, water tank 203, water tank water inlet 2031, water tank water outlet 2032, water tank drain outlet 2033;
- water cooling device 30, storage tank 301, first quick plug connector 3011, straight cooling tube 302, support 303, first groove 3031, second withdrawable tray 304, second groove 3041;
- water heating device 40, hot water tank 401, hot water tank discharge outlet 4011, direct heater 402;
- water purification device 50, combination filter 501, filter housing 5011, first withdrawable tray 5012, second quick plug connector 5013, filter elements 5014, sterilizer 502, container housing 5021, UV lamp 5022, hinge 5023;
- heat sink 601, control panel 602, control plate 603;
- rack 70.

DETAILED DESCRIPTION OF ILLUSTRATED EMBODIMENTS

Embodiments of the disclosure are described below in detail. Examples of the embodiments are illustrated in the drawings, and same or identical reference numerals in this text indicate same or identical elements or elements with same or identical functions. It should be noted that, the embodiments explained below in conjunction with the accompanying drawings are merely illustrative examples and exemplary, and are not intended to limit the invention.

In order to more fully understand the technical solution, illustrative embodiments of the disclosure are explained in detail in conjunction with the drawings. Though the invention is described with reference to the drawings and exemplary embodiments, it should be understood that the invention can be implemented in a variety of forms, and the embodiments illustrated above are not intended to limit the invention. Instead, the embodiments are illustrated to facilitate understanding of the disclosure, and to make the disclosure clear for those skilled in the art.

The atmospheric water generation system of the disclosure is described in detail in conjunction with FIGS. 1-23.

First referring to FIGS. 1-4, an atmospheric water generation system is provided in an embodiment of the disclosure, which comprises an atmospheric water generation device 10 and a control device.

In particular, the control device is configured to control the operation of the atmospheric water generation system. The atmospheric water generation device 10 comprises a water evaporator 101, a condenser 102, a compressor 103, a fan device 104, and a noise reduction device 105. Herein, the condenser 102 is connected with the water evaporator 101, and the compressor 103 is connected with the water evaporator 101 and the condenser 102 so as to cyclically cool down and supply the refrigerant. The noise reduction device 105 is disposed between the fan device 104 and the compressor 103, and the fan device 104 is disposed between the condenser 102 and the compressor 103. In such a case, outside air can pass through the water evaporator 101 to produce water and cool air, the cool air can cool down the condenser 102 and flow to the noise reduction device 105 to reduce noise, and then the remained cool air can flow to the compressor 103 and heating components of the control device, for cooling and heat dissipation.

In another word, the water evaporator 101 can produce water and meanwhile produce cool air as well. The cool air treated by means of the noise reduction device 105 for noise reduction can cool down other heating parts inside the atmospheric water generation device 10. Thus, both noise problem and energy utilization problem can be solved by the atmospheric water generation system.

In conclusion, in the atmospheric water generation system, outside air flows to the water evaporator 101 under the action of the fan device 104, such that both water and cool air can be produced. The cool air cools down the condenser 102 and flows to the noise reduction device 105 to reduce noise, and then residual cool air can flow to the compressor 103 and heating components (for example the heat sink of the control plate) of the control device, for cooling. In this way, due to the air flow design and the noise reduction device 105, the noise produced in the atmospheric water generation system can be reduced. In the meantime, cool air can be utilized to cool down the heating parts such as the compressor 103, the condenser 102, and the heat sink in the atmospheric water generation system. Hence, the atmospheric water generation system reduces noise and meanwhile utilizes residual cool air for cooling, thereby raising energy efficiency and improving practical performance of water generation.

A basic solution of the disclosure is provided in the above embodiment, which can solve the problem raised in the background and achieve a goal of the disclosure. In order to achieve improved performance and advantages, the basic solution described above can be further defined in various aspects as below.

<Atmospheric Water Generation Device>

With respect to the atmospheric water generation device 10, referring to FIGS. 4-7, the noise reduction device 105 is connected with the air outlet of the fan device 104, such that all the air flowing from the fan device 104 can be introduced to the noise reduction device 105, to ensure noise reduction effect. Herein, the fan device 104 may be an axial flow fan.

More particularly, the noise reduction device 105 may comprise a plurality of pieces of sound absorbing cotton. The plurality of pieces of sound absorbing cotton may have a three-dimensional network structure, which is provided with a plurality of air passages 1051 extending through its top and bottom portions and has a cross section in a shape of nine-by-nine Sudoku grid. Thus, the noise reduction device 105, which is made of sound absorbing cotton designed in three-dimensional network structure with a cross section in a shape of nine-by-nine Sudoku grid, can provide a plurality of air passages 1051, thereby achieving optimized noise reduction effect without affecting the air flow.

Furthermore, in order to improve noise reduction effect, several circumferentially-spaced guiding channels may be provided on the inner sidewall of each of the air passages 1051. With such arrangement, the noise reduction device 105 would not impede the transfer of the residual cool air, and optimized noise reduction effect can be achieved without affecting the air flow.

Furthermore, in order to ensure cooling and heat dissipation effect of cool air on the heating components, the noise reduction device 105 may be provided with several types of V-shape grooves at a position close to it bottom. With such arrangement, the air transferred from the air passages 1051 can quickly flow out due to reduced wind resistance, thereby ensuring heat dissipation effect of the residual cool air.

Furthermore, the atmospheric water generation device 10 may comprise an air filter 106 arranged outside the water evaporator 101, and the fan device 104 may be configured to enable the air filtered by means of the air filter 106 to enter the water evaporator 101 for production of water and cool air. Herein, the air filter 106 may utilize current aerodynamic principles in combination with multiple filtration technology, to effectively filter out harmful gas in the air.

In the atmospheric water generation device 10, the compressor 103 and the condenser 102 work as follows. The refrigerant in the water evaporator 101 or the straight cooling tube 302 absorbs heat energy and turns into gas. Then, the gas is compressed into high-temperature, high-pressure gas by means of the compressor 103, and then is transferred to the condenser 102 and is cooled into refrigerant.

The refrigerant cooled by means of the condenser 102 may be transported to the water evaporator 101 through a pipeline, and an expansion valve may be provided in the pipeline. With such arrangement, the refrigerant can realize continuous cooling function in the water evaporator 101.

As mentioned above, the residual cool air flowed out of the noise reduction device 105 can dissipate heat from the heat sink 601. The control plate 603 of the control device is the main heating part, and the heat transferred by the heat sink 601 needs to be dissipated timely. As the control plate 603 and the heat sink 601 are disposed between the noise reduction device 105 and the compressor 103, the air flowed out of the noise reduction device 105 can dissipate heat from the heat sink 601. Such dissipation by using residual cool air can raise energy efficiency.

In order to ensure that the whole atmospheric water generation system is electrically controllable and operable, the control device may further comprise a control panel 602 for displaying control information and data parameters and allowing for input of setting information and control information. The control plate 603 (which may use an existing programmable logic controller) is configured to control the operation of the whole atmospheric water generation system.

<Water Collection Device>

Figure 8:
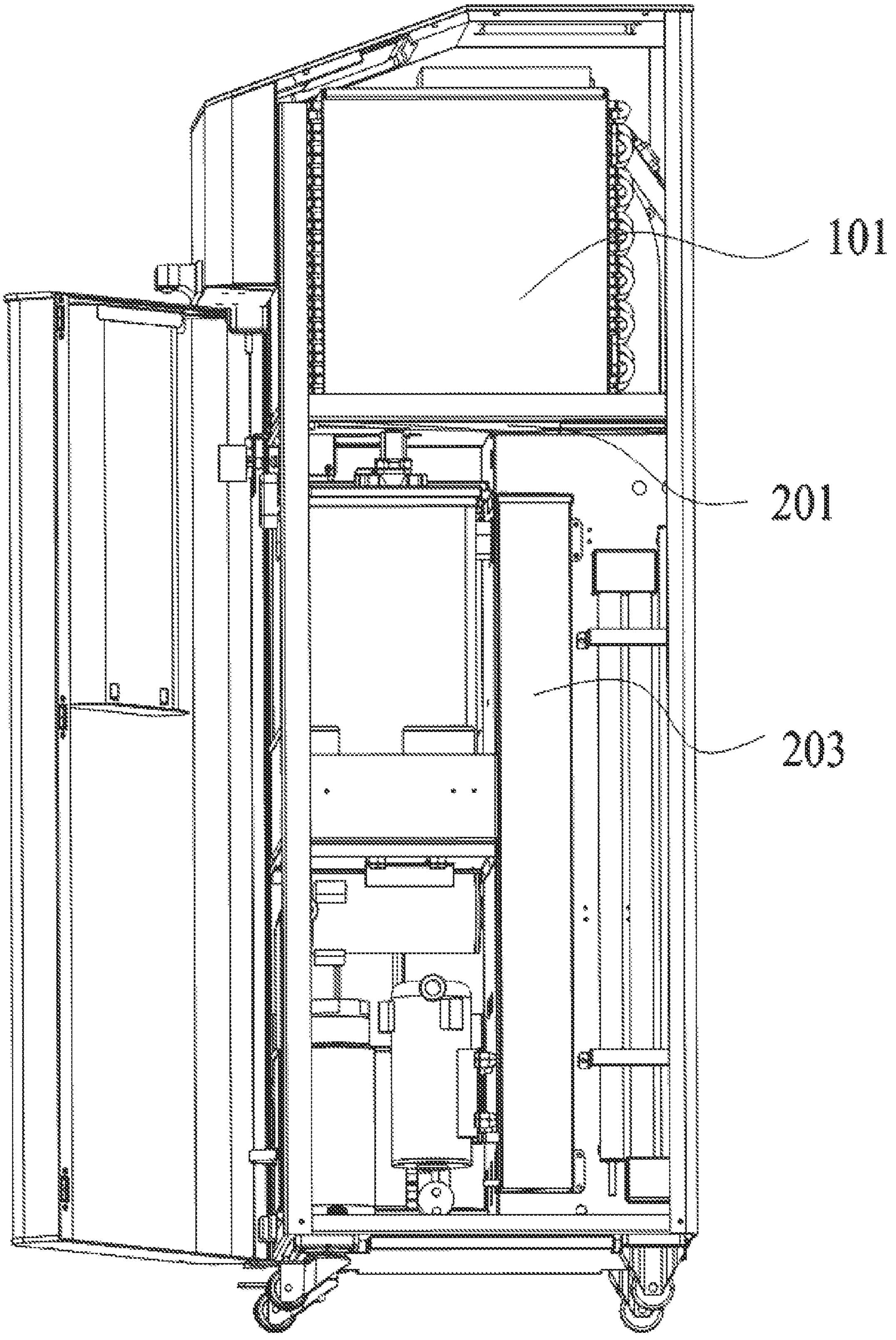
FIG. 8 is a schematic internal structure view illustrating an atmospheric water generation system according to an embodiment of the disclosure from a fourth viewing angle.
Figure 9:
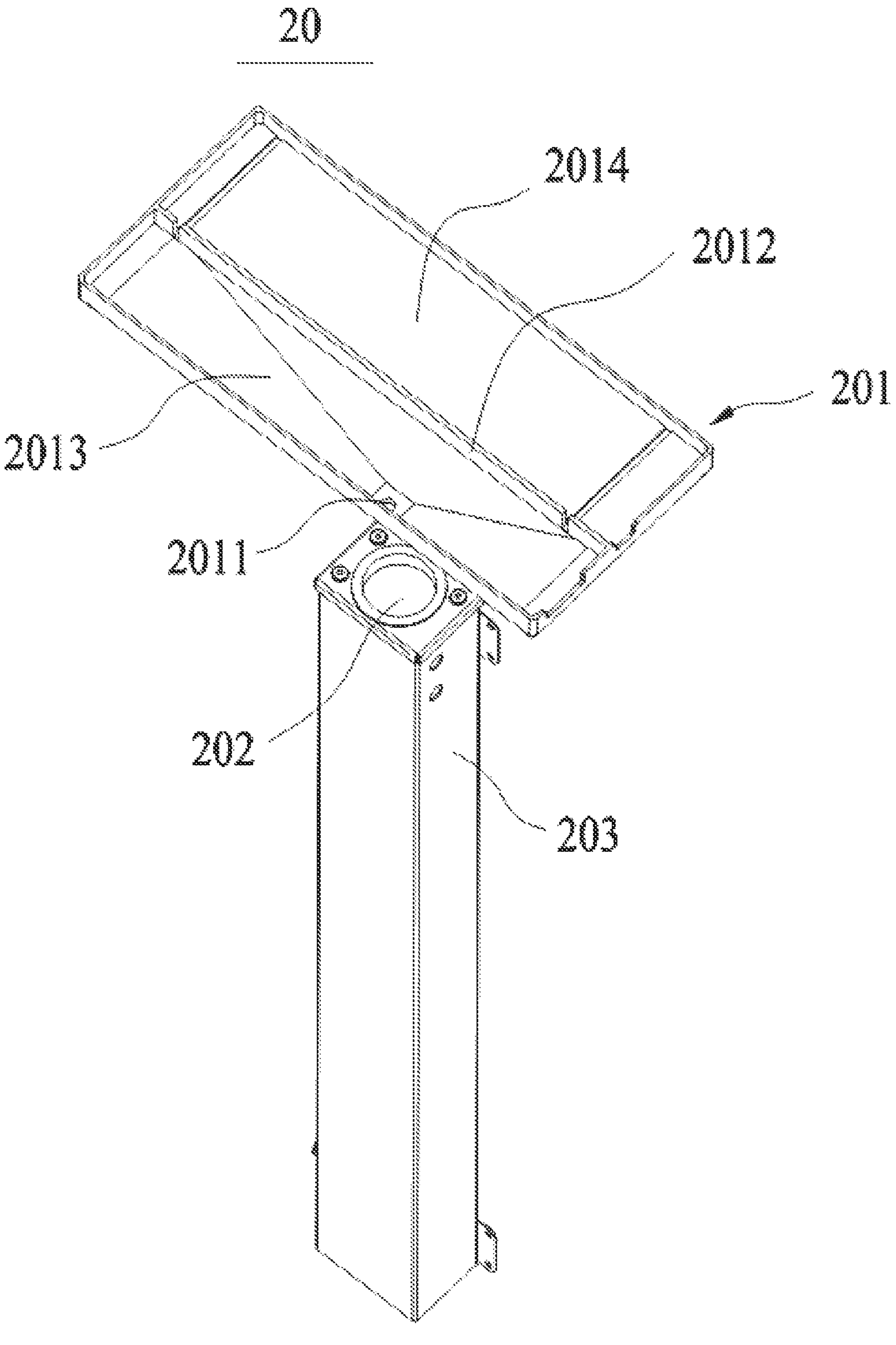
FIG. 9 is a schematic view illustrating a water collection device according to an embodiment of the disclosure.
Figure 10:
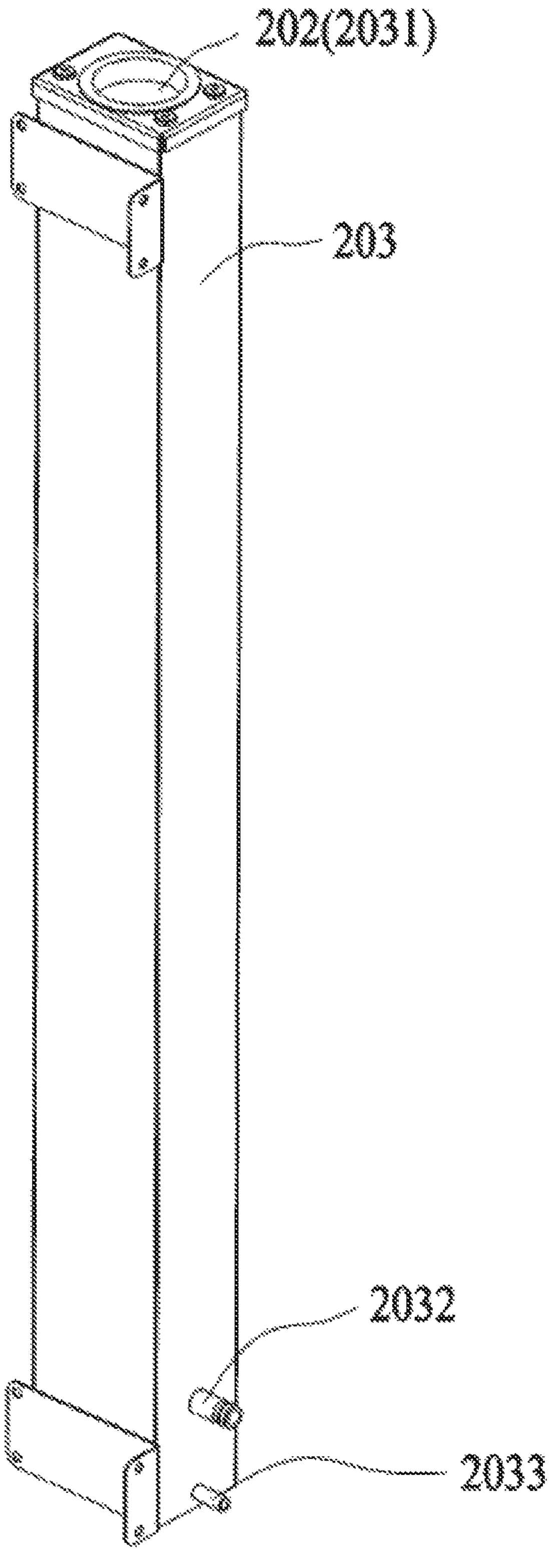
FIG. 10 is a schematic view illustrating a water tank according to an embodiment of the disclosure.
Figure 11:
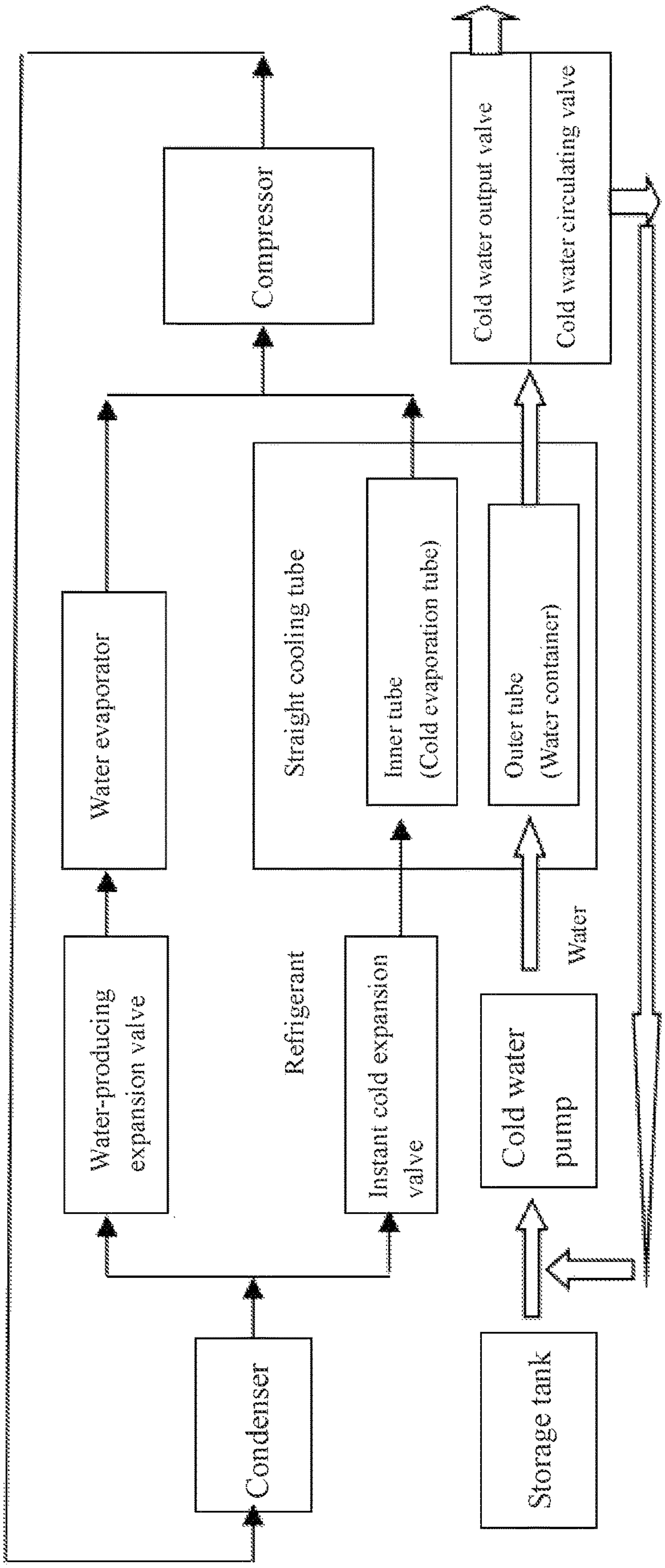
FIG. 11 is a diagram illustrating cold water refrigeration, water supply, and cold water circulation according to an embodiment of the disclosure.
Figure 12:
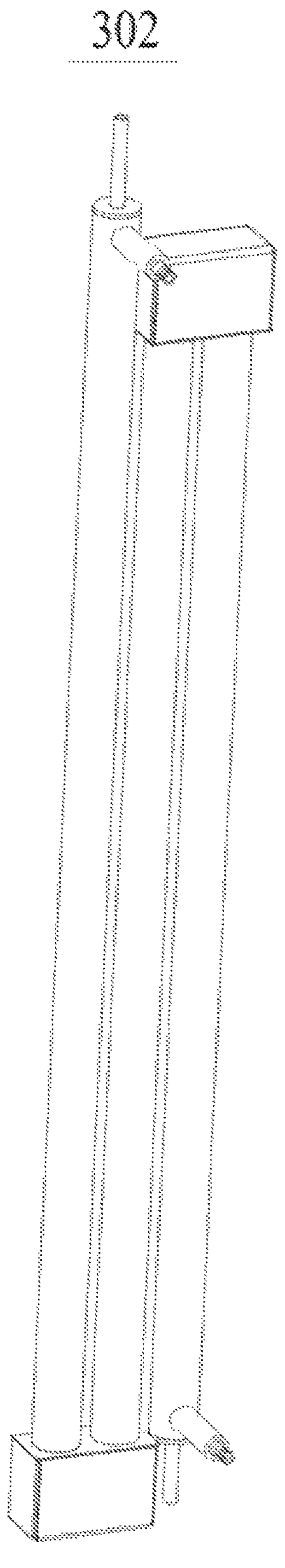
FIG. 12 is a schematic view illustrating a straight cooling tube according to an embodiment of the disclosure.
Figure 13:
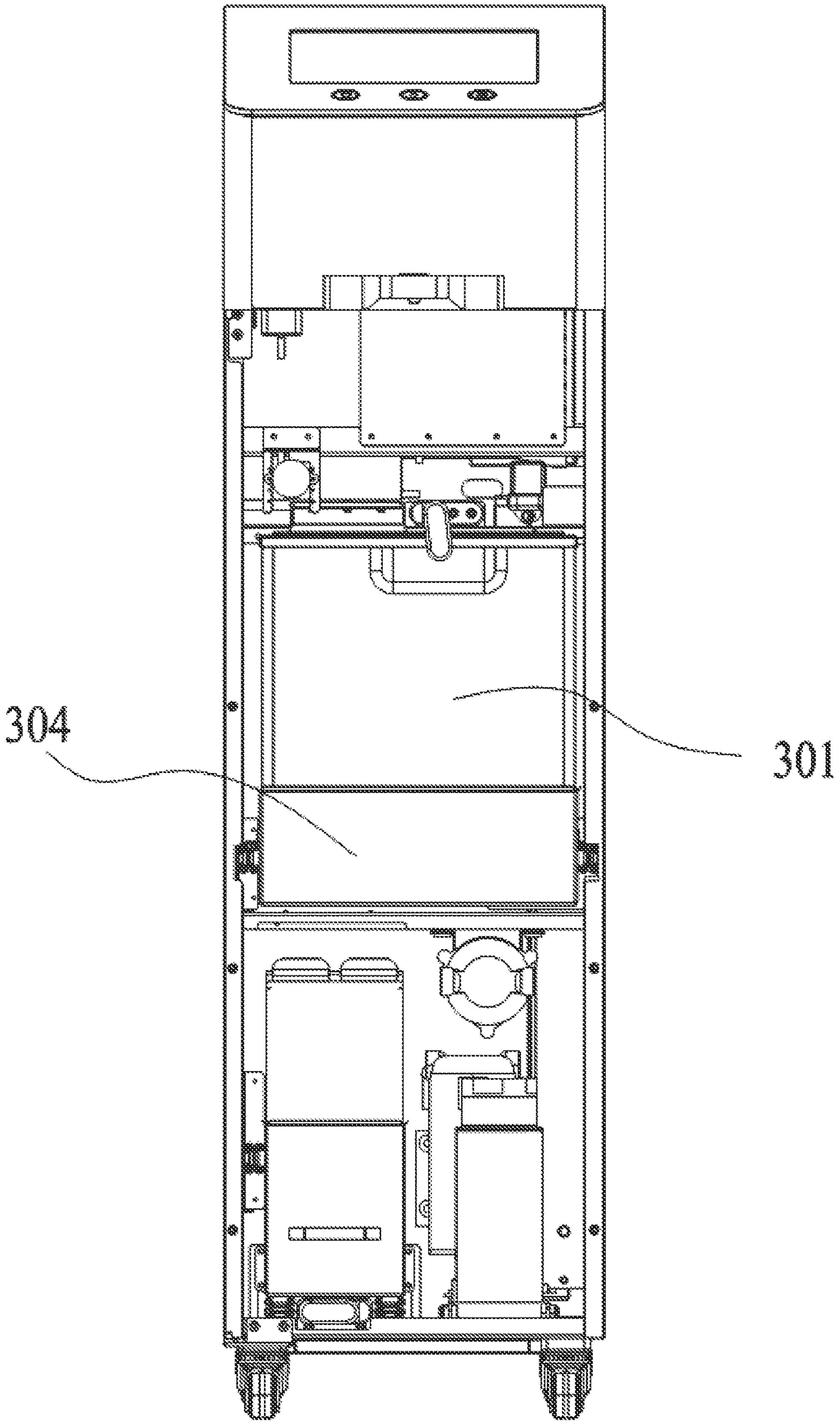
FIG. 13 is a schematic internal structure view illustrating an atmospheric water generation system according to an embodiment of the disclosure from a fifth viewing angle.
Figure 14:
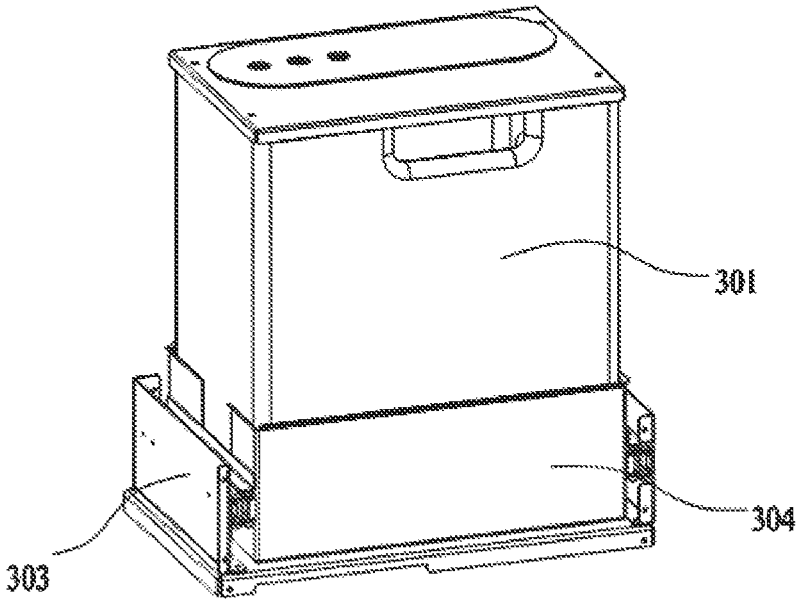
FIG. 14 is a schematic view showing partial members of a water cooling device according to an embodiment of the disclosure.
Figure 15:
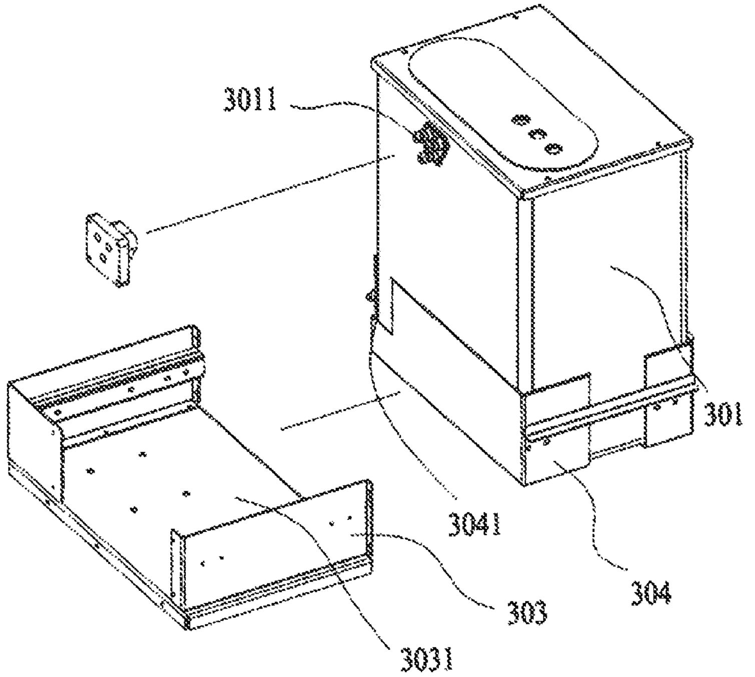
FIG. 15 is a schematic view showing partial members of a water cooling device according to an embodiment of the disclosure in a disassembled state.

Further referring to FIGS. 8-10, the atmospheric water generation system further comprises a water collection device 20, which comprises a water collecting tray 201, a water filter 202, and a water tank 203.

In particular, the water tank 203 is provided at its top surface with a water tank water inlet 2031, and is provided at a position close to its bottom portion with a water tank water outlet 2032 and a water tank drain outlet 2033. Herein, the water tank water outlet 2032 is spaced from the water tank drain outlet 2033. It is located above the water tank drain outlet 2033 and is higher than the bottom surface of the water tank 203. The water filter 202 is detachably mounted on the water tank water inlet 2031. The water collecting tray 201 is disposed between the water evaporator 101 and the water tank 203, to collect water produced by the water evaporator 101. The water collecting tray 201 is provided at its bottom with a water collecting tray water outlet 2011, to allow the collected water to flow through the water filter 202 and enter the water tank 203.

In such a case, the water collecting tray 201 serves to collect water produced by the water evaporator 101. The water flows from the water collecting tray water outlet 2011 to the water filter 202. After filtration, the water flows into the water tank 203. In such process, as the water collecting tray 201 and the water tank 203 are separately arranged and the water filter 202 is detachably mounted at the water tank water inlet 2031 provided on the top surface of the water tank 203, it is convenient to replace the water filter 202 to maintain water quality without disassembling the water tank 203. As the water tank water outlet 2032 is located above the water tank drain outlet 2033 and higher than the bottom surface of the water tank 203, a few centimeters of water may be retained at the bottom of the water tank 203, to get water deposits on the bottom surface of the water tank 203.

In such a case, by utilizing external water for cleaning in cooperation with a circulating pump, a water pump and a drain outlet, the water tank 203 can drain water out to facilitate cleaning, so as to further maintain water quality without disassembling the water tank 203.

Furthermore, a gap is left between the water collecting tray 201 and the water tank 203, and the water collecting tray water outlet 2011 is aligned with the water tank water inlet 2031 in a vertical direction. With such arrangement, the water collecting tray 201 and the water tank 203 are disposed at appropriate positions.

Herein, the water tank 203 may have an elongated shape. The water tank 203 is provided with a fixing plate to facilitate mounting on the inner side wall of the accommodation cavity of the atmospheric water generation system. The water collecting tray 201 is disposed below the water evaporator 101 by using a mounting plate. In such a case, as the water collecting tray 201 and the water tank 203 are separately arranged, it achieves convenient cleaning and replacement, and the atmospheric water generation system has an impact internal structure.

In an implementation of detachable and replaceable water filter 202, the water filter 202 may have a bowl shape, and the top opening of the water filter 202 may be provided with a flanging for abutting against the edge of the water tank water inlet 2031. With such arrangement, in combination with the separate structure of the water tank 203 and the water collecting tray 201, it can be easily picked up and put down, and it is convenient to replace the water filter 202 to maintain water quality.

Furthermore, the water tank 203 is provided at its top with a cover plate for matching with various sizes of water filters 202.

With respect to the structure of the water collecting tray 201, the water collecting tray 201 is provided with a division plate 2012 dividing it into a first tray portion 2013 and a second tray portion 2014. Herein, the first tray portion 2013 has a funnel shape, and the water collecting tray water outlet 2011 is provided at the bottom of the first tray portion 2013. The division plate 2012 is provided with a through hole allowing for communication between the second tray portion 2014 and the first tray portion 2013. A groove is provided inside the second tray portion 2014. The groove extends to communicate with the through hole. Herein, the water collected in the second tray portion 2014 can be introduced into the first tray portion 2013 due to the groove and the through hole, and then flow through the water collecting tray water outlet 2011 into the water tank 203.

More particularly, the first tray portion 2013 may be located below the water evaporator 101, and the second tray portion 2014 may be located below the condenser 102. With such arrangement, it ensures that all water produced by the water evaporator 101 can be collected.

<Water Cooling Device>

Further referring to FIGS. 11-15, the atmospheric water generation system further comprises a water cooling device 30, which comprises a storage tank 301, a cold water pump, a straight cooling tube 302, a cold water circulating valve, and a cold water output valve. Herein, the straight cooling tube 302 utilizes a structure of tubular shape with multi-segment, comprising an inner tube (i.e., a cold evaporation tube) and an outer tube (i.e., a water container), to realize quick cooling function of water.

In particular, the inner tube of the straight cooling tube 302 is in communication with the condenser 102 and the compressor 103, so as to cyclically cool down and supply the refrigerant. The outer tube of the straight cooling tube 102 is in communication with the storage tank 301, the cold water circulating valve and the cold water output valve, and the cold water circulating valve allows the cold water to cyclically flow into the cold water pump.

In another word, the refrigerant used in the inner tube (i.e., the cold evaporation tube) of the straight cooling tube 302 of the water cooling device 30 can be compressed by the abovementioned compressor 103 and then transferred to the condenser 102 for cooling, and then cyclically transferred to the inner tube of the straight cooling tube 302. In such a case, the water evaporator 101 and the straight cooling tube 302 can share one set of compressor 103 and condenser 102. In addition, the water cooling device 30 functions to perform cooling during operation, and intermittently operate in the standby state. With such arrangement, one set of compressor 103 and condenser 102 can be shared to achieve condensation for producing water and cooling function by cold water, thereby reducing the number of parts of the whole atmospheric water generation system. Consequently, the whole system has compact structure with greatly reduced volume, reduced cost and consumption, and improved practicability.

More particularly, during operation of the water cooling device 30, the straight cooling tube 302 works when cold water output is needed. Under the action of the cold water pump, the water of the storage tank 301 flows to the straight cooling tube 302, and the straight cooling tube 302 quickly cools the water to a desired temperature (for example, 3-4° C.).

In addition, by means of the cold water pump, the straight cooling tube 302, and the cold water circulating valve, a circulation of cold water can be achieved. During the standby state or when cold water output is not needed, the straight cooling tube 302 can intermittently work, to ensure that the water in the straight cooling tube 302 is kept at a temperature of 3-4° C. In this way, consumption can be reduced and energy-saving effect can be achieved.

The refrigerant cooled by the condenser 102 may be transferred to the straight cooling tube 302 through a pipeline, and an expansion valve may be provided in the pipeline. With such arrangement, the refrigerant can realize continuous cooling function in the straight cooling tube 302.

In another word, the output pipeline of the condenser 102 is provided with a water-producing expansion valve and an instant cold expansion valve, wherein the water-producing expansion valve is connected with the condenser 102 and the water evaporator 101, and the instant cold expansion valve is connected with the straight cooling tube 302 and the condenser 102. In such a case, the refrigerant used by the water evaporator 101 and the straight cooling tube 302 can be compressed by means of the compressor 103 and then transferred to the condenser 102 for cooling, and then cyclically transferred to the water-producing expansion valve and the instant cold expansion valve. Depending on the requirements of water production volume and temperature, the water-producing expansion valve and the instant cold expansion valve can be respectively automatically adjusted. Then, it can be transferred to the water evaporator 101 and an evaporative cooler inside of the straight cooling tube 302. With such arrangement, the production volume and temperature of water can be conveniently automatically controlled.

In addition, in the water cooling device 30, the storage tank 301 may be withdrawably arranged in the accommodation cavity of the atmospheric water generation system. The water inlet and the water outlet of the storage tank 301 are provided with a first quick plug connector to facilitate removal for cleaning and quick mounting of storage tank 301.

In particular, the water cooling device 30 may further comprise a support 303 and a second withdrawable tray 304. Herein, the support 303 is fixedly arranged in the accommodation cavity of the atmospheric water generation system and defines a first groove 3031 opening at an end. Herein, the second withdrawable tray 304 is slidably connected with the first groove 3031 and defines a second groove 3041, and the storage tank 301 is disposed in the second groove 3041. Both the water inlet and the water outlet of the storage tank 301 are provided with the first quick plug connector 3011.

In another word, when the storage tank 301 needs cleaning off water scale generated after extended use, the second withdrawable tray 304 can be withdrawn from the first groove 3031, such that the storage tank 301 in the second groove 3041 gets out of the accommodation cavity of the atmospheric water generation system, and then the storage tank 301 can be removed from the second groove 3041. In the meantime, the first quick plug connector 3011 of the storage tank 301 is disengaged from a quick plug connector of a joined pipe, to facilitate manual cleaning and replacement of the storage tank 301. After cleaning, the storage tank 301 can be put back in the second groove 3041, and then the second withdrawable tray 304 can be put back in the first groove 3031, such that storage tank 301 gets back in the cavity of the atmospheric water generation system with the first quick plug connector 3011 of the storage tank 301 being engaged with the quick plug connector of the pipe to be joined, thereby returning to the normal working state.

In this way, the storage tank 301 can be took out of the accommodation cavity of the atmospheric water generation system by using the withdrawable tray, such that the first quick plug connector 3011 of the storage tank 301 can be quickly disengaged from the corresponding joined pipe, to allow the storage tank 301 to be conveniently cleaned. After cleaning, the storage tank 301 can be put back into the cavity of the atmospheric water generation system by using the withdrawable tray, such that the first quick plug connector 3011 of the storage tank 301 can be quickly engaged with the corresponding pipe to be joined. Consequently, it is convenient to clean, maintain, and replace the storage tank, so as to ensure good water quality.

In order to make the second withdrawable tray 304 slidable, the second withdrawable tray 304 is provided with a sliding component, which is slidably connected with a sliding rail provided in the first groove 3031. With such arrangement, it is convenient to take or put the storage tank 301 out of or back to the accommodation cavity of the atmospheric water generation system, to facilitate cleaning of the storage tank 301 and quick mounting after cleaning.

<Water Heating Device>

Figure 16:
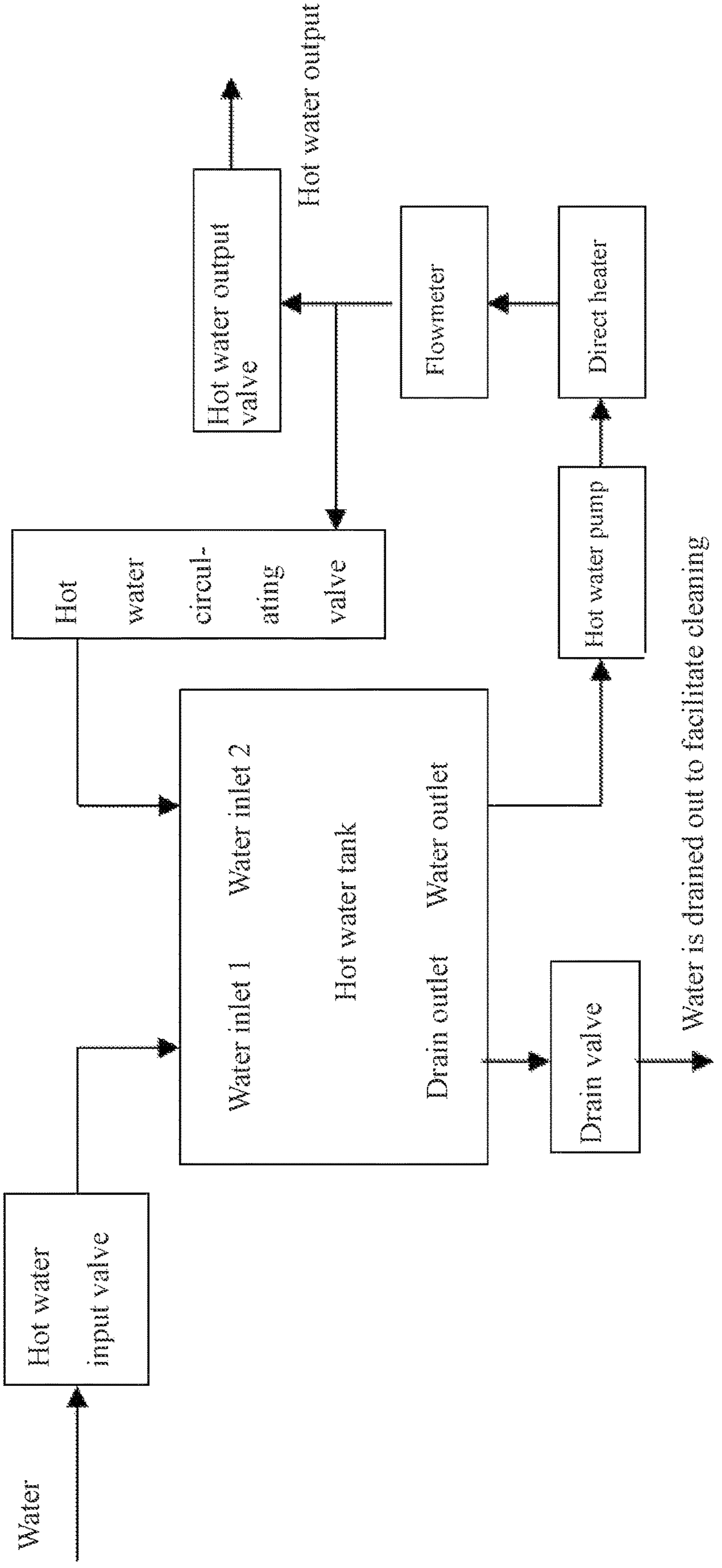
FIG. 16 is a diagram illustrating hot water treatment of atmospheric water generation according to an embodiment of the disclosure.
Figure 17:
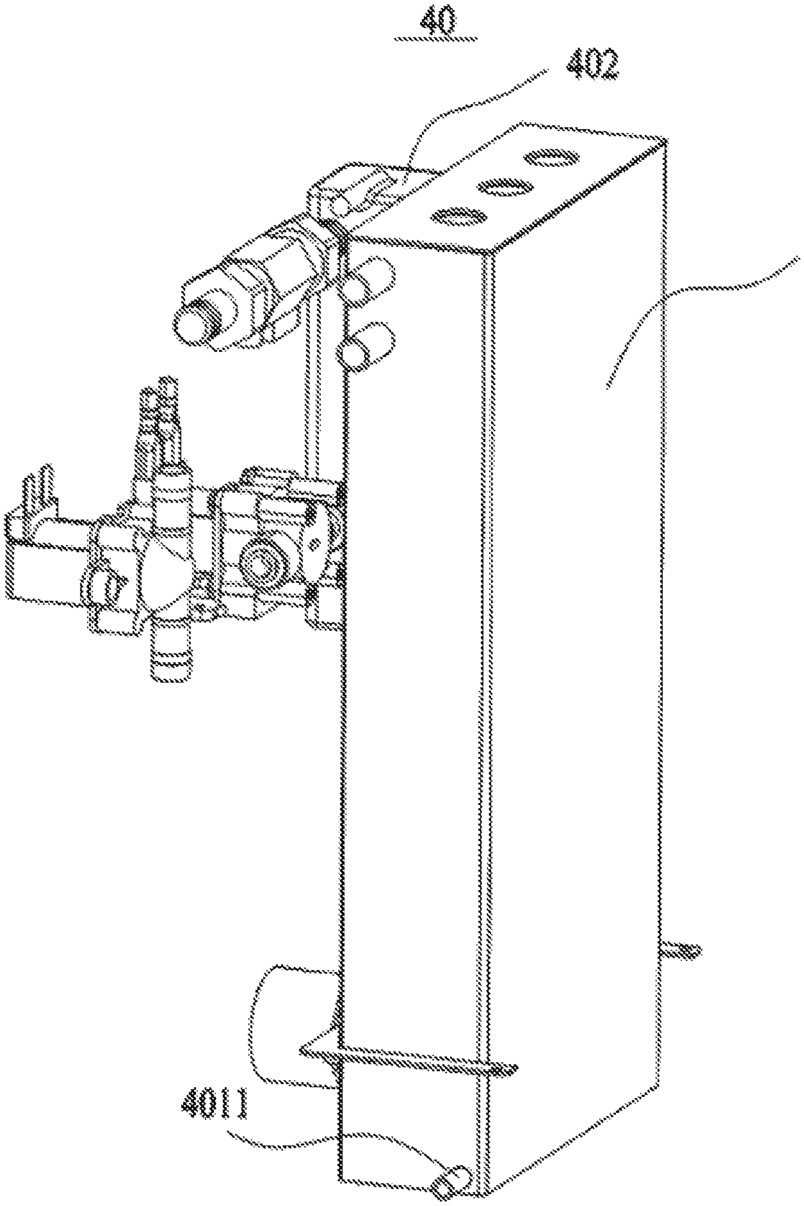
FIG. 17 is a schematic view illustrating a water heating device according to an embodiment of the disclosure.
Figure 18:
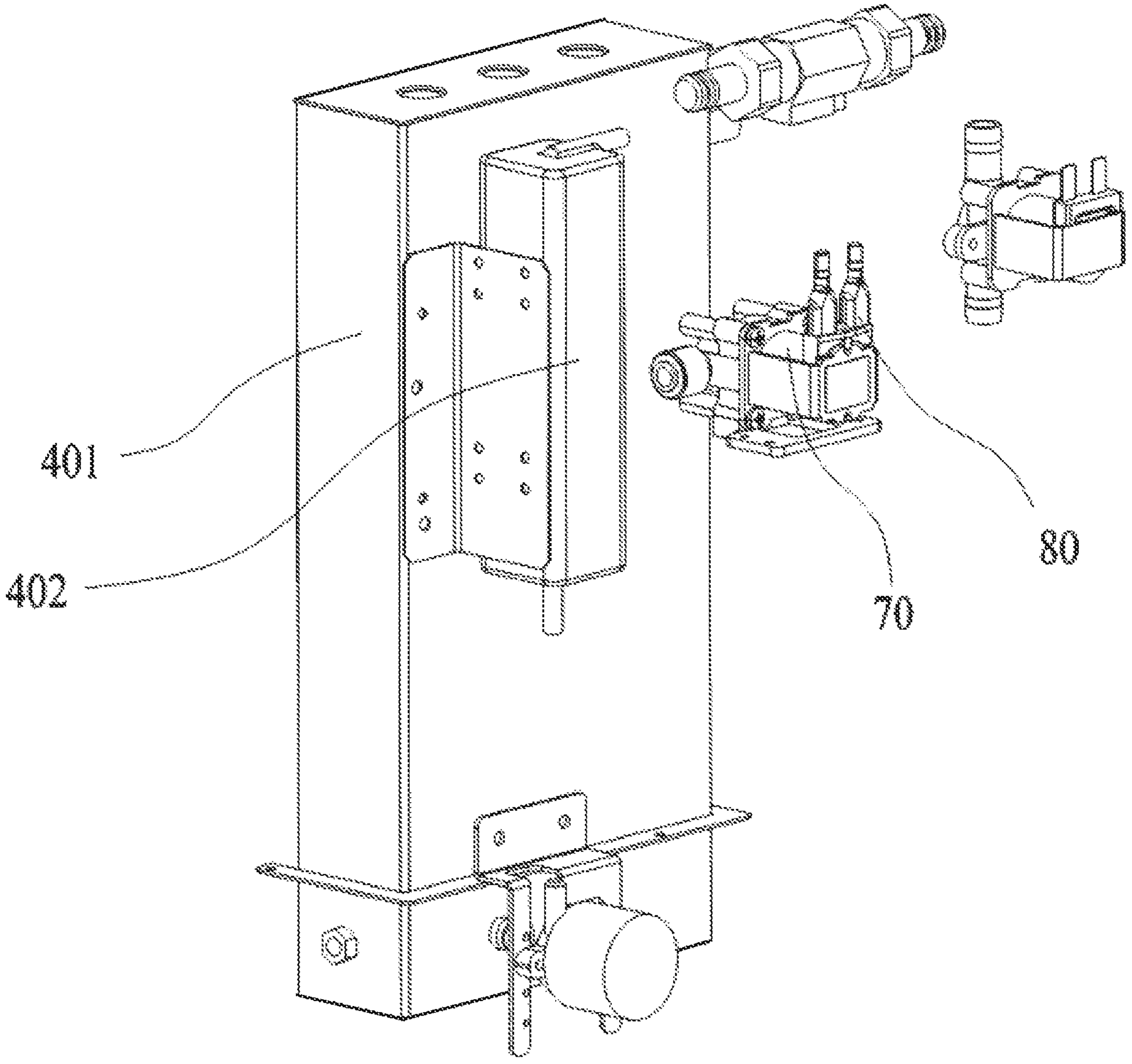
FIG. 18 is a schematic view illustrating a water heating device according to an embodiment of the disclosure from another viewing angle.
Figure 19:
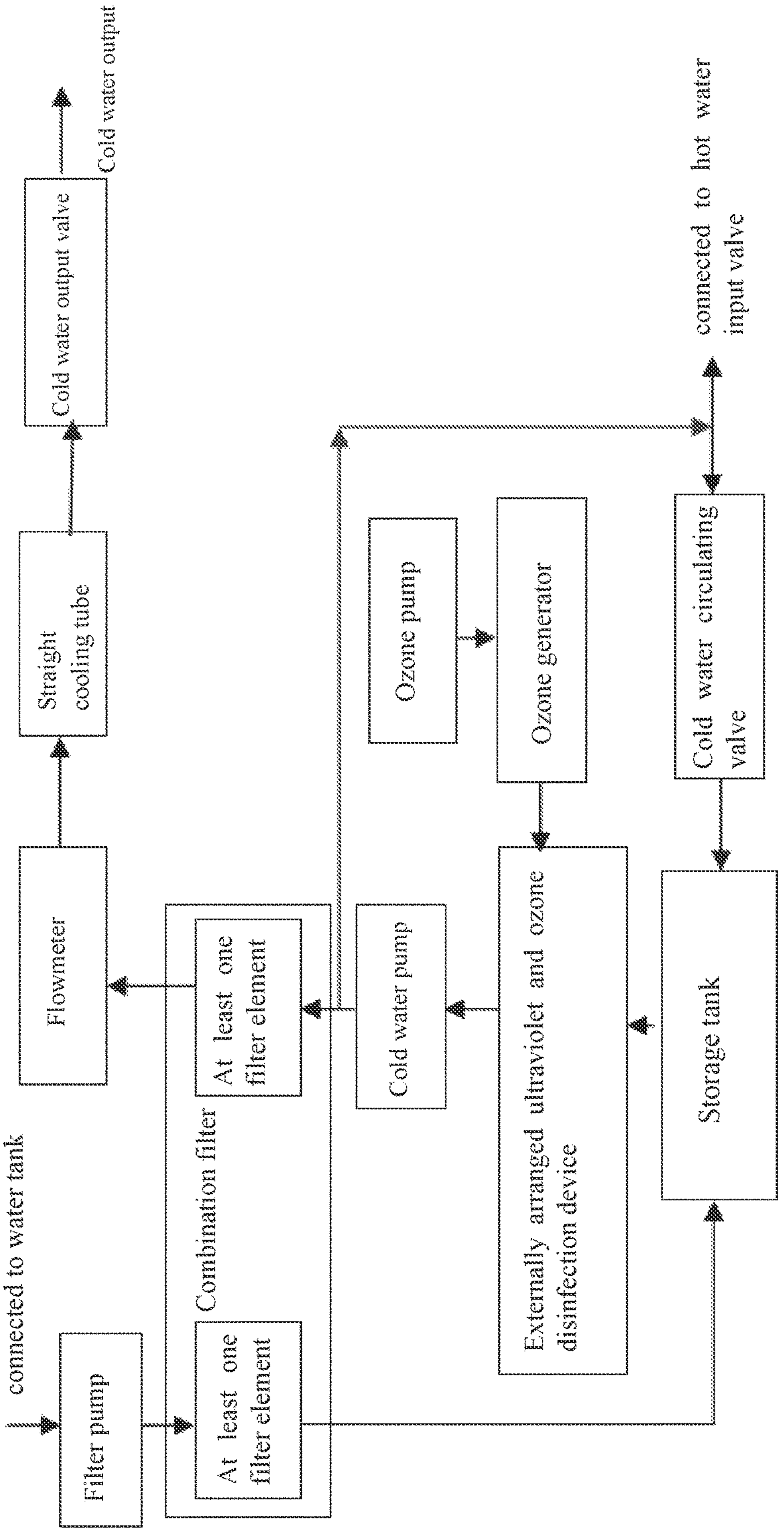
FIG. 19 is a diagram illustrating water purification treatment of atmospheric water generation according to an embodiment of the disclosure.
Figure 20:
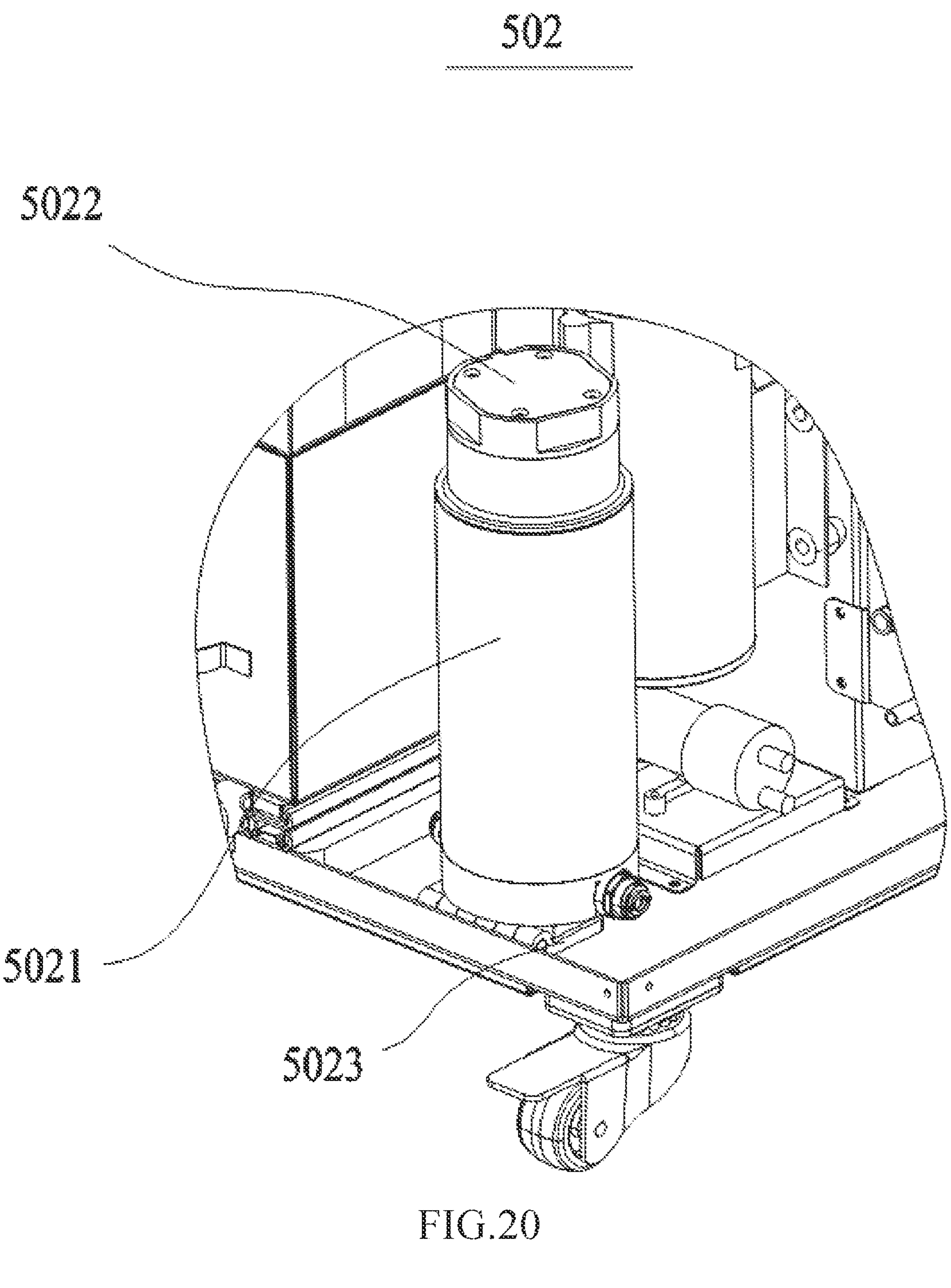
FIG. 20 is a schematic view illustrating a sterilizer according to an embodiment of the disclosure.
Figure 21:
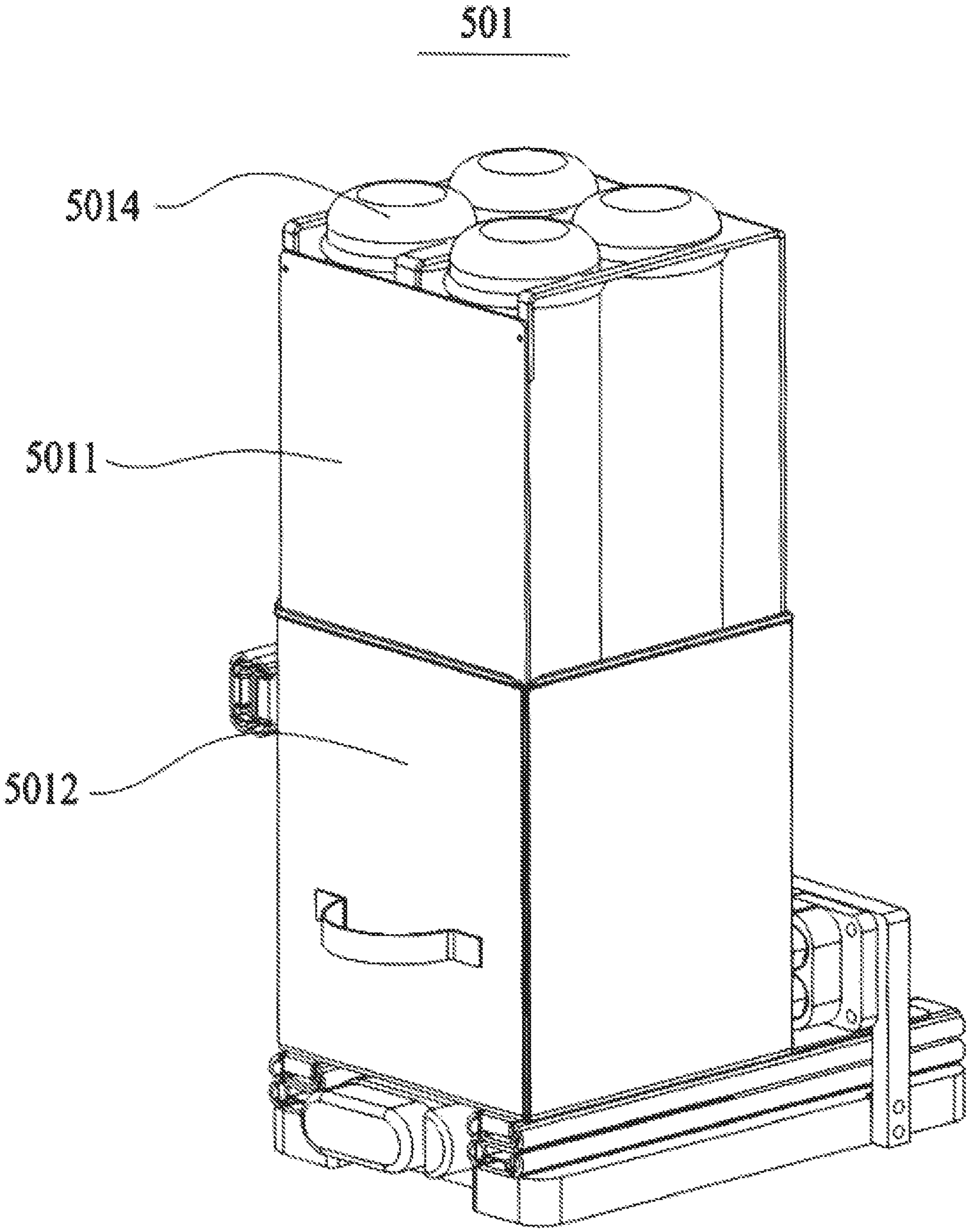
FIG. 21 is a schematic view illustrating a combination filter according to an embodiment of the disclosure.
Figure 22:
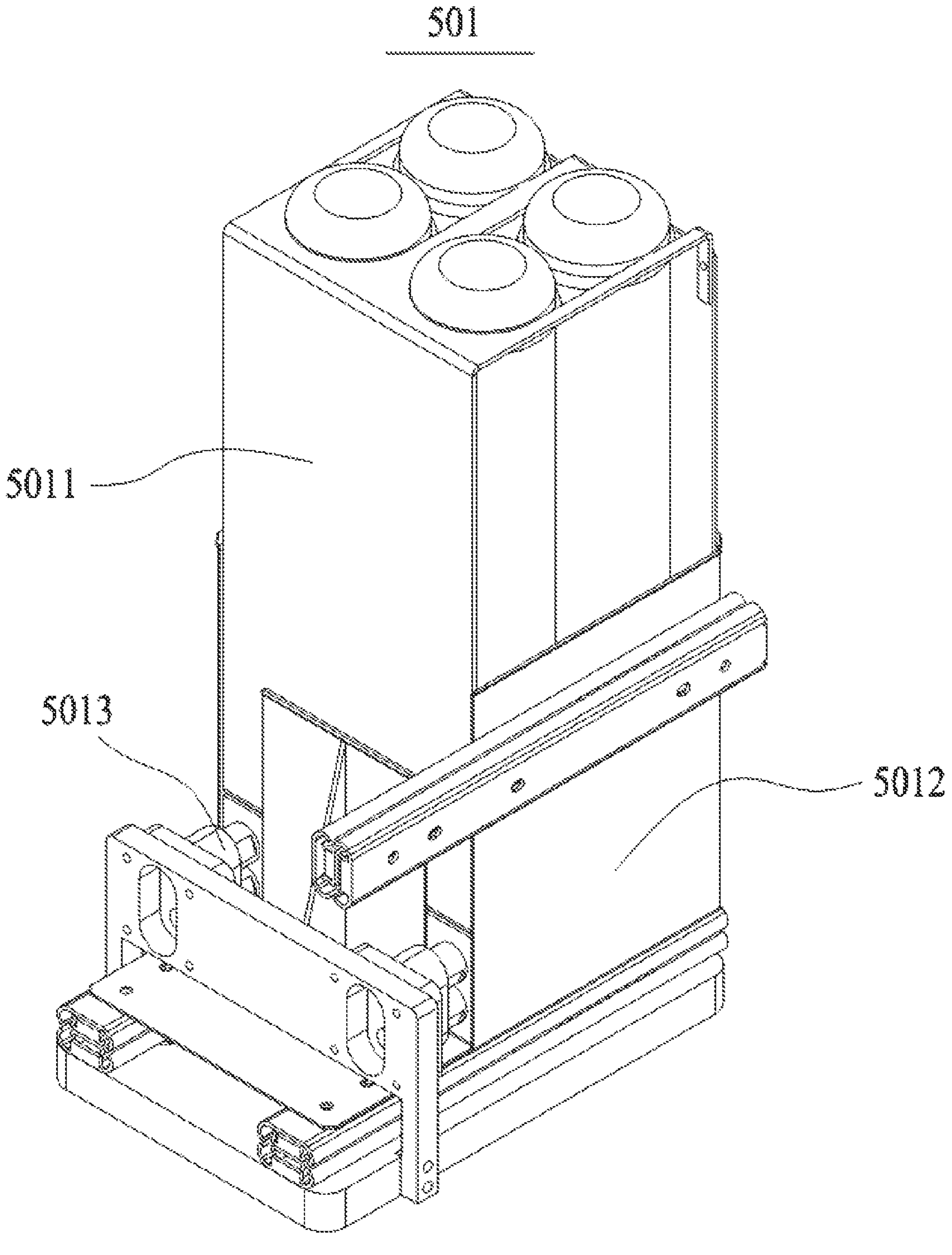
FIG. 22 is a schematic view illustrating a combination filter according to an embodiment of the disclosure from another viewing angle.

Further referring to FIGS. 16-18, the atmospheric water generation system further comprises a water heating device 40, which comprises a hot water tank 401, a direct heater 402 for quick heating of water, a hot water output valve, and a hot water circulating valve.

In particular, the hot water tank 401 is in communication with the storage tank 301, the direct heater 402 is in communication with the hot water tank 401, the hot water circulating valve, and the hot water output valve, and the hot water circulating valve allows hot water to cyclically flow into the hot water tank 401.

In another word, a hot water pump is provided in the water path communicating the hot water tank 401 and the direct heater 402, and the hot water tank 401 is in communication with the cold water circulating valve through a hot water input valve, and further in communication with the storage tank 301. Hot water is produced as follows. The water of the storage tank 301 flows through the hot water input valve to enter the hot water tank 401. By external cyclically heating (by means of the direct heater 402 for heating), the water in the hot water tank 401 is kept at a certain temperature (for example: 70° C.-80° C.). When a user needs hot water, the hot water can flow through the hot water pump and then can be heated by means of the direct heater 402, such that the water can be further heated to a desired temperature (for example, 95-100° C.) and then output through hot water outlet. Hot water is circulated as follows. During the standby state or when hot water output is not needed, the hot water flows through the direct heater 402, the hot water circulating valve, and then flows back to the hot water tank 401, thereby achieving hot water flow circulation. In such a case, the direct heater 402 intermittently works, to allow the water in the hot water tank 401 to be kept at a temperature (for example, 70° C.-80° C.) which is relatively not that high, thereby reducing consumption and meanwhile achieving sterilization function.

With respect to the hot water tank 401, it is provided with a hot water tank discharge outlet 4011 connected with a drain valve. With such arrangement, it is convenient to clean the hot water tank 401.

<Water Purification Device>

Further referring to FIGS. 19-22, the atmospheric water generation system further comprises a water purification device 50, which comprises a combination filter 501 and a sterilizer 502. Herein, the combination filter 501 is disposed in the water path communicating the water tank 203 and the storage tank 301, and in the water path communicating the storage tank 301 and the straight cooling tube 302, so as to perform water filtration. The sterilizer 502 is disposed in the water path communicating the storage tank 301 and the straight cooling tube 302, so as to accomplish water disinfection.

That is, the water of the water tank 203 can be filtered by means of the combination filter 501 before entering the storage tank 301, and can be cyclically sterilized by means of external sterilizer 502 after flowing out of the storage tank 301.

In particular, the combination filter 501 may comprise a filter housing 5011, a first withdrawable tray 5012, and a second quick plug connector 5013, and a plurality of various types of filter elements 5014 are disposed in the filter housing 5011. Herein, the filter housing 5011 is disposed in the first withdrawable tray 5012. The first withdrawable tray 5012 is slidably connected to the accommodation cavity of the atmospheric water generation system. The second quick plug connector 5013 is connected with the water inlet and the water outlet of filter elements 5014. In this way, the filter housing 5011 can be took out of the cavity of the atmospheric water generation system by using the withdrawable tray, such that the quick pipe connector of the filter elements 5014 can be quickly disengaged from the corresponding joined pipe, to allow the filter elements 5014 to be conveniently replaced. After replacement, the filter housing 5011 can be put back into the cavity of the atmospheric water generation system by using the withdrawable tray, such that the quick pipe connector of the filter elements 5014 can be quickly engaged with the corresponding pipe to be joined. Consequently, it is convenient to clean, maintain, and replace the filter elements, so as to ensure good water quality.

Herein, each set of second quick plug connector 5013 comprises one water inlet and one water outlet, and a plurality of sets of second quick plug connectors 5013 may be provided as needed. Each set of second quick plug connector 5013 corresponds to one of a plurality of dedicated filter elements 5014.

In addition, the arrangement that the first withdrawable tray 5012 is slidably connected to the accommodation cavity of the atmospheric water generation system particularly refers to a structure, in which the first withdrawable tray 5012 is provided with a sliding component slidably connected with a sliding rail provided in the accommodation cavity, such that the first withdrawable tray 5012 can be pushed or pulled to slide in the accommodation cavity.

The combination filter 501 may perform preliminary filtration by using at least one of the filter elements 5014 in the water path communicating the water tank 203 and the storage tank 301. The combination filter 501 may perform fine filtration by using at least one of the filter elements 5014 in the water path communicating the storage tank 301 and the straight cooling tube 302.

The sterilizer 502 may be an externally arranged ultraviolet and ozone disinfection device. It may comprise an UV lamp which can be conveniently replaced. It may be outward inclined, such that during replacement of the UV lamp, the UV lamp can be conveniently replaced due to the outward inclined sterilizer 502. The sterilizer 502 is further provided with an ozone inlet. The ozone disinfection can be accomplished by using an ozone pump for feeding the ozone generated by the ozone generator into the sterilizer 502, whereby the ozone fully dissolved in the flowing water can accomplish disinfection and sterilization.

It is conceivable that the water of the storage tank 301 can flow to the sterilizer 502 so as to externally cyclically achieve ultraviolet and ozone disinfection, that is, ultraviolet germicidal irradiation and ozone disinfection for the flowing water.

In particular, the sterilizer 502 comprises a container housing 5021, an UV lamp 5022, and an ozone generator. Herein, the water inlet of the container housing 5021 is connected with the storage tank 301. The water outlet of the container housing 5021 is connected with the combination filter 501. The UV lamp 5022 is placed into the container housing 5021 so as to accomplish disinfection of the water in the container housing 5021. The ozone generator is in communication with the container housing 5021 to allow the ozone to be fed into the container housing 5021 to accomplish disinfection.

That is, the sterilizer 502, which is disposed in the water path communicating the storage tank 301 and the combination filter 501, uses external ultraviolet to perform cyclically irradiation and thus ultraviolet germicidal irradiation for the flowing water. The ozone disinfection is accomplished by feeding the ozone generated by the ozone generator into the container housing 5021 which involves ultraviolet disinfection, whereby the ozone fully dissolved in the flowing water can accomplish disinfection and sterilization.

Furthermore, the container housing 5021 may be mounted in the accommodation cavity of the atmospheric water generation system by using a hinge 5023, such that the container housing 5021 can swing and can be switched among an upright state and an inclined state. It is conceivable that the container housing 5021 can be manually moved, so as to switch the container housing 5021 among the upright state and the inclined state. In the inclined state, it is convenient for a user to clean and replace the UV lamp 5022.

Herein, the UV lamp 5022 may be placed in and mounted to the container housing 5021 from the top of the container housing 5021. The water inlet of the container housing 5021 may be located at a position of the container housing 5021 close to its bottom portion, and the water outlet of the container housing 5021 may be located at a position of the container housing 5021 close to its top portion. With such arrangement, flowing water can accomplish disinfection and sterilization in the container housing 5021.

In conclusion, water purification is performed as follows. By means of the cold water pump, the water in the storage tank 301 is pumped into the container housing 5021 to accomplish disinfection and sterilization, and then is pumped into the combination filter 501 to accomplish filtration, and then is pumped into the straight cooling tube 302. Alternatively, by means of the cold water pump, the water in the storage tank 301 is pumped into the container housing 5021 to accomplish disinfection and sterilization, and then is pumped to the cold water circulating valve and then enters the storage tank 301 again. In such a case, the water in the storage tank 301 cyclically flows, which ensures water quality.

<Cleaning Device>

Figure 23:
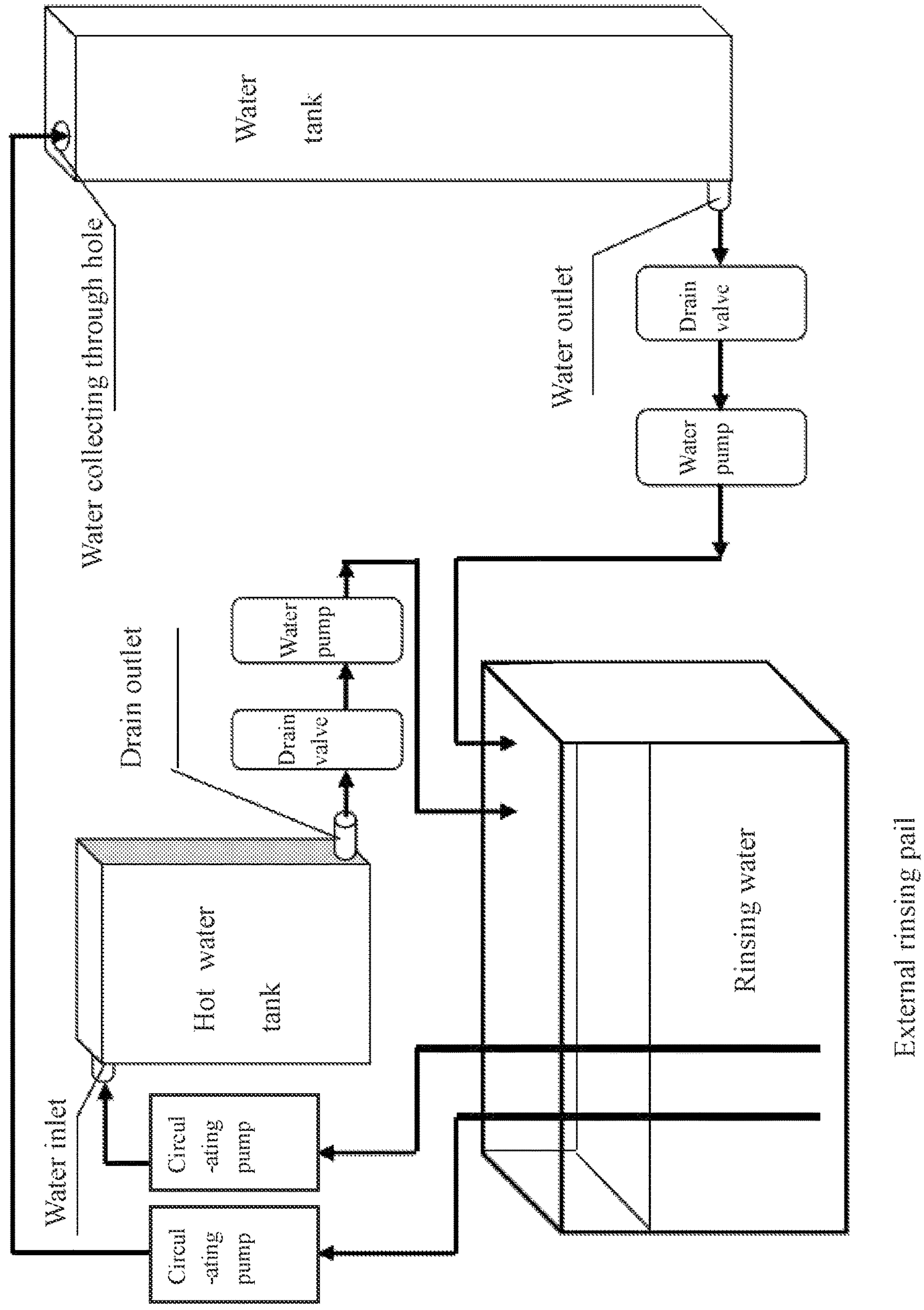
FIG. 23 is a diagram illustrating water tank cleaning according to an embodiment of the disclosure.

Further referring to FIG. 23, the atmospheric water generation system further comprises a cleaning device, which comprises an external rinsing pail, a circulating pump, and a water pump. The cleaning device is used for cleaning the water tank 203 and the hot water tank 401.

The water tanks can be cleaned in a process as follows. Firstly, the drain valve can be opened. Under the action of the water pump, the water in the water tank (the storage tank or the hot water tank) can be pumped into the external rinsing pail. Under the action of the circulating pump, the rinsing water in the external rinsing pail can be fed into the water tank. In this way, the water tank can be cleaned cyclically. During cleaning, the external rinsing pail may get a rinsing water change so as to ensure water quality.

In particular embodiments, the atmospheric water generation system may particularly use a structure further comprising a rack 70. The rack 70 may define the accommodation cavity, which comprises a first cavity, a second cavity, and a third cavity. The first cavity at the top has a layout including the water evaporator 101, the condenser 102, and the fan device 104 of the atmospheric water generation device 10, and the water heating device 40. The second cavity has a layout including the compressor 103, the noise reduction device 105, the control plate 603, and various pumps. The third cavity has a layout including the water collection device 20, the water cooling device 30, the water purification device 50, and various pumps. With such arrangement, the whole atmospheric water generation system has a compact structure.

In addition, the rack 70 of the atmospheric water generation system may be provided with an automatic sensing water outlet connected with the hot water output valve and the cold water output valve, to allow automatic water supply for users. Hot water supply can be controlled by the hot water output valve, and cold water supply can be controlled by the cold water output valve. Herein, flowmeters may be provided in the water paths of the hot water supply and the cold water supply, to achieve control of water supply in corporation with the control device.

It should be noted that the terms, such as “center”, “longitudinal”, “transverse”, “length”, “width”, “thickness”, “upper”, “lower”, “front”, “rear”, “left”, “right”, “vertical”, “horizontal”, “top”, “bottom”, “inner”, “outer”, “clockwise”, and “counterclockwise” as used in the description, refer to position and orientation relationships as shown in the drawings. They are not intended to indicate or hint a limitation in terms of specific orientation or configuration and operation with specific orientation to the described device or element, and should not be regarded as a limitation to the present disclosure.

Furthermore, it should be noted that the terms "first" and "second" are used for convenience of description and are not intended to indicate or imply relative importance or hint the quantity of components. Hence, it is understood that components defined by the terms "first" and "second" are intended to indicate or hint one or more of such components. Unless explicitly stated otherwise, it should be understood that "the plurality of" as used in the description refer to two or more.

Unless defined or specified otherwise, terms such as "mount", "connect", "attach", and "fix" used in the description are intended to have meanings commonly understood in a broad sense. For example, "connect" may refer to fixedly connect, or detachably connect, or integrally connect; or mechanically connect, or electrically connect; or directly connect, or indirectly connect via an intermedium, or internally communicate between two components, or interact between two components. The meanings of the terms used herein may be understood by those skilled in the art in accordance with specific conditions.

Unless defined or specified otherwise, descriptions for example a first feature is located "above" or "below" a second feature as used in the description, may indicate that the first and second features are directly contacted with each other, or the first and second features are indirectly contacted via an intermedium. Furthermore, the description that the first feature is located "on", "above" or "over" the second feature may indicate that the first feature is located right above or obliquely above the second feature, or merely indicate that the first feature is located at a position higher than the second feature. The description that the first feature is located "under", "below" or "underneath" the second feature may indicate that the first feature is located right below or obliquely below the second feature, or merely indicate that the first feature is located at a position lower than the second feature.

The terms, such as "an embodiment", "some embodiments", "an example", "particular examples", or "some examples" as used in the description, merely indicate that a particular feature, structure, material, or characteristic described with reference to the embodiment or example is provided in at least one of the embodiments or examples of the disclosure. In the description, exemplary illustration for these terms are not intended to describe a same embodiment or example. The feature, structure, material, or characteristic as described may be combined in any one or more of embodiments or examples in an appropriate manner. In addition, those skilled in the art may combine or join various embodiments or examples explained in the description.

Although the disclosure has been described as above with reference to some embodiments, it should be understood that these embodiments are merely exemplary embodiments and are not intended to limit the disclosure. Those skilled in the art may change or amend the embodiments or provide modifications or equivalent arrangements without departing from the scope of the disclosure.

The invention claimed is:

1. An atmospheric water generation system, comprising:

an atmospheric water generation device;

a controller; and a water cooling device;

wherein the controller is configured to control an operation of the atmospheric water generation system;

the atmospheric water generation device comprises a water evaporator, a condenser, a compressor, a fan device, and a noise reduction device, the condenser is connected with the water evaporator and the compressor is connected with the water evaporator and the condenser, to cyclically cool down and supply a refrigerant, the noise reduction device is disposed between the fan device and the compressor and the fan device is disposed between the condenser and the compressor in such a manner that outside air can pass through the water evaporator to produce water and cool air, the cool air can cool down the condenser and then flow to the noise reduction device to reduce noise, and then remained cool air can flow to the compressor and a heating component of the controller, for cooling and heat dissipation;

the water cooling device comprises a storage tank, a cold water pump, a straight cooling tube, a cold water circulating valve, and a cold water output valve; and an inner tube of the straight cooling tube is in communication with the condenser and the compressor, so as to cyclically cool down and supply the refrigerant, an outer tube of the straight cooling tube is in communication with the storage tank, the cold water pump, the cold water circulating valve, and the cold water output valve, to allow cold water to cyclically flow back to the cold water pump through the cold water circulating valve under an action of the cold water pump, and allow cold water to be output from the cold water output valve when cold water output is needed.

2. The atmospheric water generation system according to claim 1, wherein the noise reduction device is disposed at an air outlet of the fan device; and the noise reduction device is provided with a plurality of pieces of sound absorbing cotton which are arranged to have a three-dimensional network structure, and the three-dimensional network structure is provided with at least one air passage extending through a top portion and a bottom portion of the three-dimensional network structure.

3. The atmospheric water generation system according to claim 2, wherein a plurality of circumferentially-spaced guiding channels are provided on an inner sidewall of the air passage.

4. The atmospheric water generation system according to claim 1, wherein a storage tank is withdrawably arranged in an accommodation cavity of the atmospheric water generation system, and a water inlet and a water outlet of the storage tank are provided with a first quick plug connector.

5. The atmospheric water generation system according to claim 1, wherein a water heating device is further provided, which comprises a hot water tank, a hot water pump, a direct heater, a hot water output valve, and a hot water circulating valve, wherein the hot water tank is in communication with the storage tank, the direct heater is in communication with the hot water tank, the hot water circulating valve, and the hot water output valve, to allow hot water to cyclically flow back to the hot water tank through the hot water circulating valve under an action of the hot water pump, and allow hot water to be output from the hot water output valve when hot water output is needed.

6. The atmospheric water generation system according to claim 1, wherein a water collection device is further provided, which comprises a water collecting tray, a water filter, and a water tank;

the water tank is provided at a top surface with a water tank water inlet and is provided at a position close to a bottom portion with a water tank water outlet and a water tank drain outlet, wherein the water tank water outlet is spaced from the water tank drain outlet, and is located above the water tank drain outlet and is higher than a bottom surface of the water tank;

the water filter is detachably mounted on the water tank water inlet, the water collecting tray is disposed between the water evaporator and the water tank, to collect water produced by the water evaporator, and the water collecting tray is provided at a bottom portion with a water collecting tray water outlet, to allow collected water to flow through the water filter and enter the water tank.

7. The atmospheric water generation system according to claim 6, wherein a water purification device is further provided, which comprises a combination filter and a sterilizer, wherein the combination filter is disposed in a water path communicating the water tank and the storage tank, and in a water path communicating the storage tank and the straight cooling tube, so as to perform water filtration; and the sterilizer is disposed in a water path communicating the storage tank and the cold water pump, so as to accomplish water disinfection and sterilization.

8. The atmospheric water generation system according to claim 7, wherein the sterilizer is provided with a container housing, an UV lamp, and an ozone generator, the container housing is mounted in an accommodation cavity of the atmospheric water generation system by using a hinge, such that the container housing can swing and can be switched among an upright state and an inclined state; a water inlet of the container housing is connected with the storage tank, a water outlet of the container housing is connected with the combination filter, the UV lamp is detachably placed into the container housing so as to accomplish disinfection of the water in the container housing, and the ozone generator is in communication with the container housing to allow ozone to be fed into the container housing to accomplish water disinfection.

9. The atmospheric water generation system according to claim 7, wherein the combination filter is provided with a filter housing, and various types of filter elements are disposed in the filter housing, the filter housing is withdrawably disposed in the accommodation cavity of the atmospheric water generation system, and a water inlet and a water outlet of the filter elements are provided with a second quick plug connector.

10. The atmospheric water generation system according to claim 6, wherein the system further comprises a cleaning device, which is provided with an external rinsing pail, a circulating pump, a drain valve, and a water pump, the drain valve is disposed on a drain outlet of the hot water tank or on the water tank drain outlet, the circulating pump communicates a water inlet of the hot water tank or water tank water inlet with the external rinsing pail, and the water pump communicates the drain valve with the external rinsing pail.

11. The atmospheric water generation system according to claim 7, wherein the system further comprises a rack which defines the accommodation cavity of the atmospheric water generation system, the accommodation cavity comprises a first cavity, a second cavity, and a third cavity, wherein the water evaporator, the condenser, and the fan device of the atmospheric water generation device, and the water heating device are disposed in the first cavity, the compressor of the atmospheric water generation device, the noise reduction device, and the control plate of the controller are disposed in the second cavity, and the water collection device, the water cooling device, and the water purification device are disposed in the third cavity.

* * * * *